United States Patent [19]

Kane et al.

[11] Patent Number: 5,652,832
[45] Date of Patent: Jul. 29, 1997

[54] METHOD AND APPARATUS FOR DIAGNOSIS AND CORRECTION OF PERIPHERAL DEVICE ALLOCATION FAULTS

[75] Inventors: Edward S. Kane, Framingham; Raouf W. Bortcosh, Natick; Chandra K. Bajpai, Stoughton; Patrick J. Sansonetti, Jr., Wellesley; Daniel P. Femino, Brighton, all of Mass.

[73] Assignee: SystemSoft Corporation, Natick, Mass.

[21] Appl. No.: 555,925

[22] Filed: Nov. 13, 1995

[51] Int. Cl.⁶ ............................................. G06F 11/00
[52] U.S. Cl. .................. 395/181; 395/183.02; 395/183.2
[58] Field of Search ........................... 395/180, 181, 395/182.07, 182.03, 183.19, 650, 600, 700, 500, 183.2, 183.02

[56] References Cited

U.S. PATENT DOCUMENTS 4,974,150  11/1990  Long et al. .................... 395/180
5,404,494  4/1995   Garney ......................... 395/500
5,519,851  5/1996   Bender et al. ................. 395/500
5,537,597  7/1996   Sandage ........................ 395/700

Primary Examiner—Robert W. Beausoliel, Jr.
Assistant Examiner—Ly V. Hua
Attorney, Agent, or Firm—Testa, Hurwitz, and Thibeault, LLP

[57] ABSTRACT

A system for diagnosing and resolving faults in the allocation of resources to PCMCIA-compliant devices includes an extension of a super client to include functionality for storing and generating information about resources allocated to the sockets, as well information regarding any failed requests for resource allocation. A fault detection and correction element interprets that information to identify faults in the allocation of resources to the PCMCIA-compliant devices. Those faults are dynamically corrected via modification of a super client or card services resources database, and do not require reinitialization, or "rebooting," of the digital data processor.

8 Claims, 20 Drawing Sheets

INTERNAL ERROR
ATA TYPE
IO OR MEMORY NOT FOUND

ADDITIONAL IO REQUIRED TO
CONFIGURE THE ATA DRIVE

IRQ ERROR MODEM CARD

1. IRQ IN USE
2. IRQ NOT AVAILABLE

ALL IRQ'S ARE IN USE OR NOT AVAILABLE.

DISPLAY THE IRQ RESOURCES SHOWING THE IRQ AVAILABLE FOR PCMCIA AND MARK THEM AS IN USE.

ADVISE THE USERS TO FREE UP AN IRQ FOR USE BY THE MODEM CARD.

MODEM CARD
BIOS DATA AREA FULL

1. NO MORE COM PORTS AVAILABLE.

ALL 4 COM PORTS ARE IN USE. ONLY 4 COM PORTS CAN BE CONFIGURED ON THE PC.

METHOD AND APPARATUS FOR DIAGNOSIS AND CORRECTION OF PERIPHERAL DEVICE ALLOCATION FAULTS

RESERVATION OF COPYRIGHT

The disclosure of this patent document contains material which is subject to copyright and/or mask work protection. The owner thereof has no objection to facsimile reproduction by anyone of the patent document or the patent disclosure, as it appears in the U.S. Patent and Trademark Office patent file or records, but otherwise reserves all copyright and/or mask work rights whatsoever.

BACKGROUND OF THE INVENTION

The invention pertains to digital data processing and, more particularly, to the diagnosis and correction of faults in peripheral devices that are coupled with a computer. The invention has application in configuring PCMCIA-compatible devices, or PC Cards used with a personal computer.

Personal computers am increasingly present in the home and office. With the advent of new user interfaces, they are now easier to use and, hence, are gaining ready acceptance in the marketplace. Impediments to wide acceptance of personal computers, however, include the difficulty of adding new components, such as peripheral devices, and configuring them. For example, in order to add a modem that permits a personal computer to communicate over phone lines, the user may be required to disassemble the computer, insert a circuit board, reassemble the computer and, then, configure its software.

A development that alleviates this difficulty is the so-called PCMCIA card, or "PC Card." This is a credit card-sized unit that contains miniaturized peripheral device circuitry, e.g., modem circuitry, and that plugs into a recessed socket on the outside of the computer case. The cards can typically be "hot plugged," i.e., inserted into an operating computer and configured by software for essentially immediate operation. Likewise, they can be unplugged to make way for other cards.

To facilitate use of PC Cards, an international standards committee defined the hardware and software layers of a peripheral device service subsystem for controlling and communicating with the units. At the lowest level is a physical layer that includes sockets, adapters and hardware circuitry for achieving mechanical and electrical communication between the host computer and a PC Card. A socket services layer resides above the physical layer and provides a register-level software interface to the PC CARD and its socket. This includes socket configuration and resource mapping. At the next level, the card services layer oversees transactions, including resource allocation, between clients and the socket services layer.

Clients reside at the next level and include applications programs, drivers and "super clients." Drivers are typically provided by manufacturers to provide support for specific PC Cards manufactured for them. Super clients provide driver support for a wide variety of PC Cards. Among the super clients is the CARDID module supplied as part of the CardSoft™ software package from the assignee hereof.

A further understanding of the construction and operation of PC Cards and the requisite support software may be attained, for example, by reference to Mori, *The PCMCIA Developers' Guide* (Sycard Technology 1994).

Although the PC Cards and the accompanying hardware and software have greatly facilitated peripheral device use, resource conflicts remain a problem. Many portable computers, for example, permit simultaneous use of two PC Cards. If the drivers for those cards attempt to allocate the same resource, e.g., the same interrupt channel, one or both cards will not operate properly. This is compounded by the resource demands of non-PCMCIA compatible hardware connected to the computer, e.g., a serial-port mouse.

Accordingly, an object of this invention is to provide improved systems for controlling peripheral devices and, particularly, for resolving conflicts between those devices.

Another object of the invention is to provide such systems as can be implemented on a range of personal computers and for use with a range of peripheral devices, including PCMCIA compatible devices.

Still another object of the invention is provide such systems as can operate automatically, as well as under user control.

SUMMARY OF THE INVENTION

The above objects are attained by the invention, which provides a system for diagnosing and resolving faults in the allocation of resources to peripheral devices and, particularly, to PCMCIA-compliant devices.

In one broad aspect, the invention provides improvements to a digital data processor of the type having PCMCIA-compliant sockets and a peripheral device service subsystem for controlling and handling communications between client applications and PC Cards received in those sockets. The peripheral device service subsystem includes a super client, by way of non-limiting example, the aforementioned CARDID module of the CardSoft™ product, that requests resources on behalf of a PC Card and the socket in which it has been plugged. The super client includes a resource database through which it tracks resources allocated to the PC Cards and sockets configured by it.

The subsystem also includes a card services layer that responds to allocation requests from the super client, as well as from other clients (e.g., drivers), for allocating the requested resources. For these purposes, the card services includes its own resource database that tracks allocated resources.

According to this broad aspect, the improvement includes an extension of the super client to include functionality for storing and generating information about resources allocated to the sockets, as well information regarding any failed requests for resource allocation. The improvement further includes a fault detection and correction element that interprets such information supplied by the super client to identify faults in the allocation of resources to the sockets and PC Cards. Such faults include conflicts between a PC Card and another device for a single resource, such as an interrupt channel, memory or input/output space.

The fault detection and correction element, further, dynamically corrects at least certain faults by modifying the super client resources database and the card services resources database, e.g., by reassigning resources assigned to the sockets. Faults corrected in this manner are resolved immediately and do not require reinitialization, or "rebooting," of the digital data processor.

The invention provides, in a related aspect, a mechanism for permanent correction faults. In this regard, the fault detection and correction element can modify initialization files upon which the super client and the card services layer rely to generate the resources databases. For example, the element can modify the DOS operating system file CONFIG.SYS or other such initialization files from which the databases are created, e.g., the CSALLOC.INI and CARDID.INI files generated by the aforementioned CardSoft™ product. The fault detection and correction element can also modify or add new driver files, for example, if it detects a mismatch between those present on the digital data processor and those required for proper operation of the PC Cards.

Further aspects of the invention provide extensions to the card services layers for storing information regarding failed allocation requests generated by other clients, e.g., drivers. That information includes the identity of the requesting client, the type of resource requested and the resulting error. The fault detection and correction element can respond to this information, along with any generated by the super client, to identify and correct allocation faults. Through this aspect, the invention extends its fault detection and correction capabilities to include resource requests made on behalf of PC Cards not covered by the super client.

According to a still further aspect of the invention, the fault detection and correction element can include an expert system for interpreting information supplied by the super client and/or by card services to identify and correct resource allocation faults. That expert system can, for example, rely on a decision tree for such interpretation.

Other aspects of the invention provide methods for improving the operation of a digital data processor in accordance with the operations described above.

These and other aspects of the invention are evident in the drawings and in the detailed description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
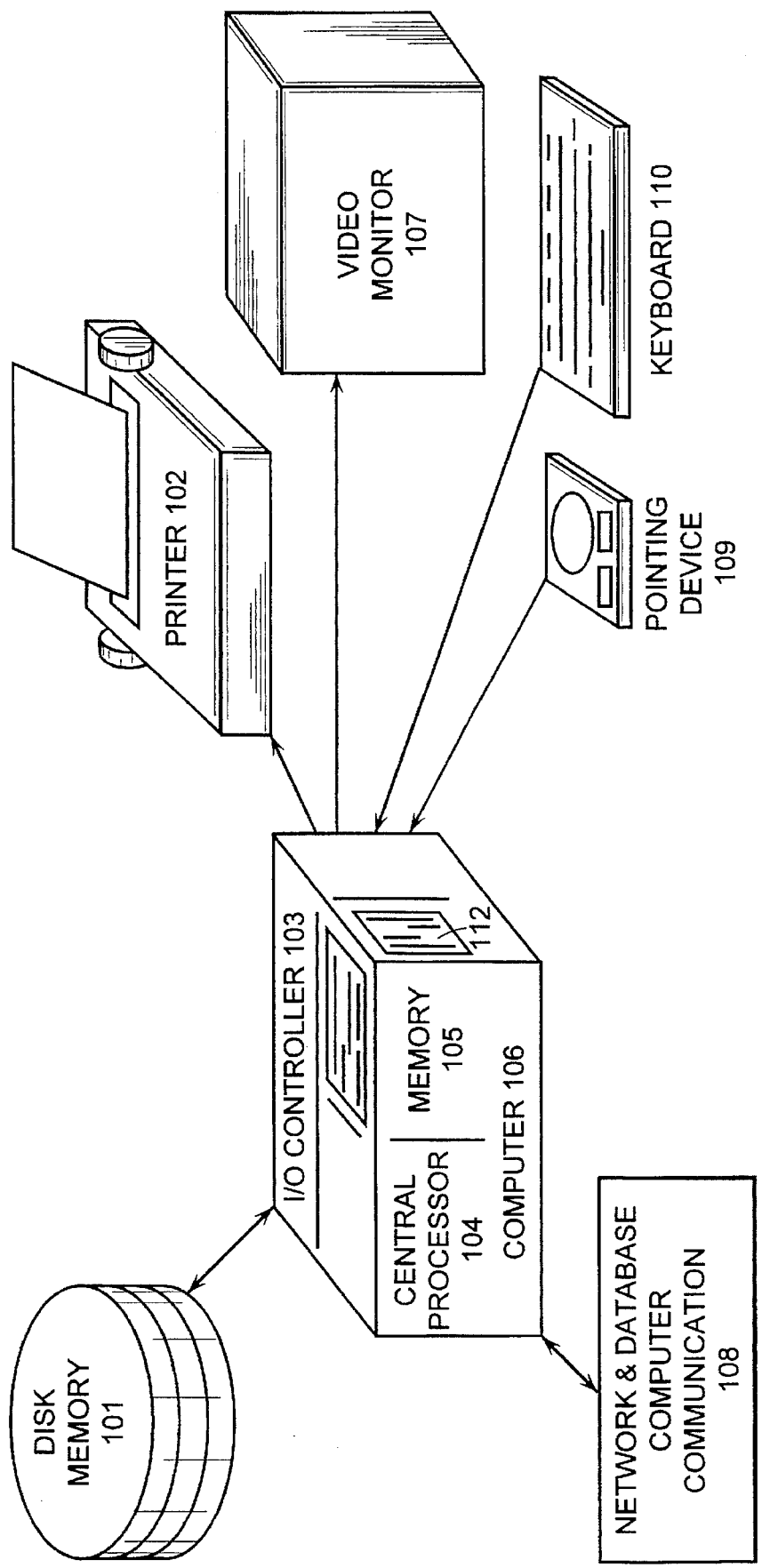
FIG. 1 illustrates a digital data processing system of the type used to practice the invention.

FIG. 1 illustrates a digital data processing system of the type used in connection with practice of the invention. Computer 106 is connected to data processing peripheral units comprising a disk memory 101, a computer communications network 108, a video monitor 107, a keyboard 110, and a pointing device 109. The disk memory 101 serves as a non-volatile storage element for information accessed by the computer 106. The computer communications network 108 serves to allow access to non-volatile storage elements and databases or other peripheral devices among a collection of computers. The monitor 107, the keyboard 110, and the pointing device 109 provide an interface between the computer 106 and the user. Specifically, the monitor 107 presents a graphic display of signals generated by the computer 106, while the keyboard 110 and pointing device 109 convert typed messages and position signals into computer-readable form.

The illustrated computer 106 includes functional units comprising an I/O controller 103, a microprocessor-based central processing unit (CPU) 104, and a (random access) memory unit 105. The i/o controller 103 is an interface between the computer 106 and its peripheral units. The central processor 104 serves as the primary source of control, arithmetic, and logic operations within the computer 106. Further, the memory unit 105 provides volatile, rapid-access storage for the computer 106, particularly for the central processing unit 104.

An external PCMCIA adapter or socket 112 permits PCMCIA components to be inserted in the computer 106 in the conventional manner.

The illustrated hardware used for practice of the invention can be selected from any one of many commercially available programmable digital computers. As described below, the illustrated embodiment operates on an "IBM-compatible" personal computer operating with the Windows™ operating systems available from Microsoft Corporation.

Figure 2:
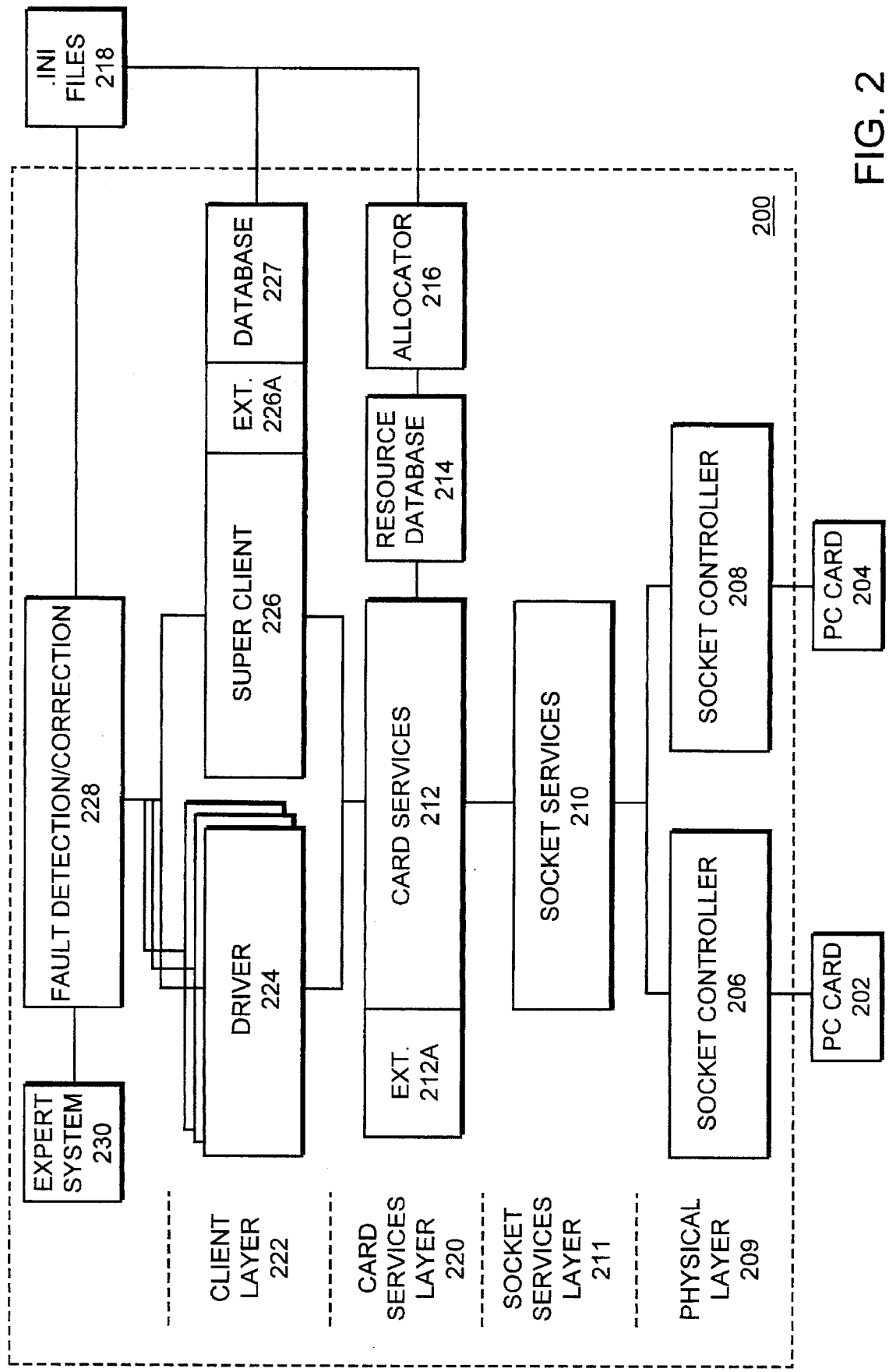
FIG. 2 illustrates a peripheral device control subsystem according to the invention for controlling, communicating with, and detecting faults in peripheral devices coupled with the digital data processing system.

FIG. 2 depicts a peripheral device service subsystem 200 according to the invention for controlling, communicating with, and detecting faults in PCMCIA-compatible devices, or PC Cards, 202, 204 coupled with the computer 106. The devices 202, 204 can be any commercially available PCMCIA-compatible device, e.g., modems, network adapters, or memory cards. As evident in the drawing and in discussion below, the subsystem 200 includes hardware and software components, the latter of which typically can be executed in special-purpose hardware but, preferably, which are executed as processes on CPU 104 in a conventional manner and in accord with the teachings below.

The subsystem 200 includes a physical interface layer for mechanically and electrically coupling with the PC Cards 202, 204. This includes electro-mechanical connectors and circuitry (not illustrated) of the type well known in the art. This also includes socket controllers 206, 208, which are also of the type well known in the art. A further understanding of the construction and operation of these elements, as well as others of the physical layer 209 of the PCMCIA control architecture, may be attained by reference to the The PCMCIA Developers' Guide, Second Ed. (Sycard Technology 1994–1995), the teachings of which are incorporated herein by reference.

A socket services module 210 is coupled to the physical interface to provide a register-level interface to the PC Cards, their sockets and controllers 206, 208. This includes, by way of non-limiting example, socket configuration and resource mapping. The socket services module, as well as other elements (not shown) in the socket services layer 211 of the PCMCIA control architecture, are well known in the art. A further understanding of their construction and operation may be attained by reference to The PCMCIA Developers' Guide, Second Ed., supra.

The illustrated card services module 212 oversees transactions, including allocating resources, between clients and the socket services module 210. In order to track resources available and assigned to the PC Cards 202, 204 and sockets 206, 208, the illustrated system includes, at the card services layer, resource database 214. A resource allocation utility 216 initializes the database 214 based on information provided in initialization files 218 or elsewhere on the computer 106, e.g., on disk memory 101. Those initialization files typically include the PCMCIA-directed commands in the DOS operating system file CONFIG.SYS or other such initialization files, e.g., the CSALLOC.INI and CARDID.INI files of the aforementioned CardSoft™ product.

Module 212, database 214, allocator 216 and other elements (not shown) in the card services layer 220 can be constructed and operated in a conventional manner known in the art for the card services layer of the PCMCIA-control architecture (see, for example, *The PCMCIA Developers' Guide, Second Ed.*, supra.) and, preferably, in accord with the card services layer of the CardSoft™ product available from the assignee hereof. Regardless of whether modelled after the CardSoft™ product or other card services layer, the construction and operation of illustrated layer 220 and, more particularly, card services module 212, is preferably modified to include extension 212A to store information regarding failed allocation requests generated by the driver 224 and super client 226, discussed below. That information includes the identity of the requesting client, the type of resource requested and the resulting error.

The peripheral device control subsystem 200 further includes a client layer 222 with drivers 224 and super client 226. The client layer also includes applications programs (not illustrated) that execute on CPU 104 and that communicate with the PC Cards 202, 204 via the card services layer 222. The driver 224 and super client 226 control the initialization and configuration of the PC Cards 202, 204, and are responsible for requesting resources for them. The drivers 224 direct initialization and configuration of specific PC Cards and are, typically, provided by the PC Card manufacturers. The super client 226 can direct initialization and configuration of many different types of PC Cards. To this end, the super client includes a database 227 to track resources allocated to PC Cards and sockets configured by it.

The super client 226 initializes the database 227 based on information provided in initialization files 218 or elsewhere on the computer 106, e.g., on disk memory 101. Those initialization files typically include the PCMCIA-directed commands in the DOS operating system file CONFIG.SYS or other such initialization files, e.g., the CARDID.INI file of the aforementioned CardSoft™ product.

Drivers 224, super client 226, and other elements (not shown) in the client layer 222 can be constructed and operated in a conventional manner known in the art for the client layer of the PCMCIA control architecture (see, for example, *The PCMCIA Developers' Guide, Second Ed.*, supra.). Super client 226, however, is preferably constructed and operated in accord the super client CARDID module (including its executable, initialization and library files) provided as part of the aforementioned CardSoft™ product. Regardless of whether modelled after the CardSoft™ product or another super client, the construction and operation of illustrated super client 226 is preferably modified to include extension 226A that stores and generates information about resources allocated to the sockets, as well information regarding any failed requests for resource allocation.

Illustrated subsystem 200 further includes a fault detection and correction element 228 that interprets the information supplied by extensions 212A and 226A, as well as other information available frown the PCMCIA control architecture, to identify faults in the allocation of resources to the PC Cards 202, 204 and their sockets 206, 208. These faults include, for example, conflicts between a PC Card and another device (e.g., another PC Card or other device connected to computer 106) for a resource such as an interrupt channel (IRQ), memory space or input/output space.

The fault detection and correction element 228 dynamically corrects certain ones of those faults by modifying the super client resources database 227 or the card services resources database 214, e.g., by reassigning resources assigned to the PC Cards 202, 204 and sockets 206, 208. Faults corrected in this manner are resolved immediately and do not require reinitialization, or "rebooting," of the CPU 104 and computer 106.

The fault detection and correction element 228 permanently corrects faults, as well, by modifying the initialization files 218 (or other information) from which the allocator 216 and super client 226 generate the database 214 and 227. Thus, for example, the element 228 can modify the DOS operating system file CONFIG.SYS (or the CardSoft™ product CSALLOC.INI or CARDID.INI files) to correct driver 224 parameters and assignments. In addition, the element 228 can update or add executable code for the drivers 224 and/or super client 226.

Fault detection and correction element 228 utilizes expert system 230 to interpret the supplied information in order to identify and correct resource allocation faults. In a preferred embodiment, that expert system 230 utilizes a decision tree to interpret that information.

Figure 3:
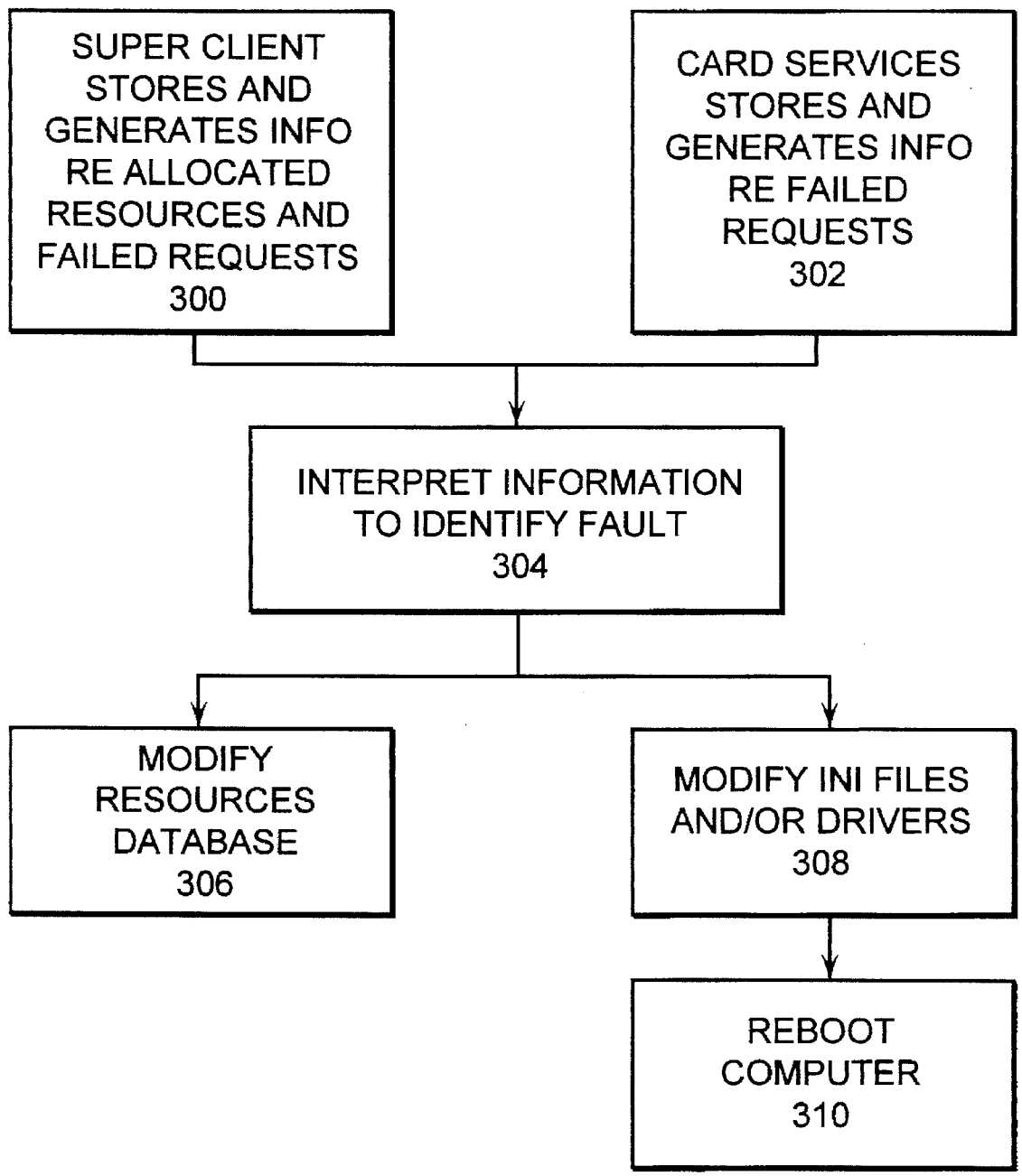
FIG. 3 is a flow chart of the operation of the peripheral device control subsystem of FIG. 2.
Figure 4A:
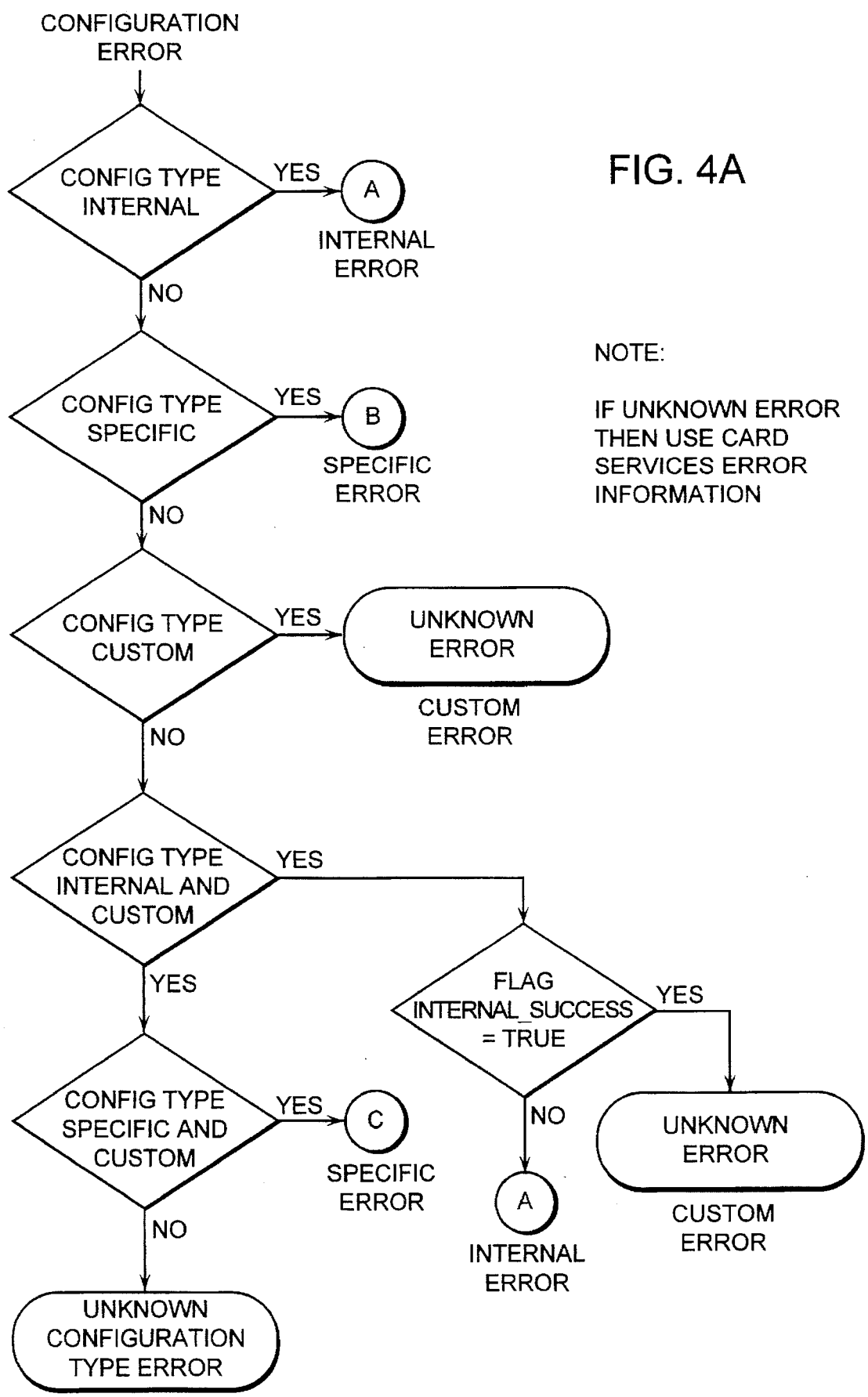
FIGS. 4A–4H are flow charts depicting a preferred decision tree-type analysis performed by an expert system to detect and correct configuration used by super client, in a system according to the invention.
Figure 4B:
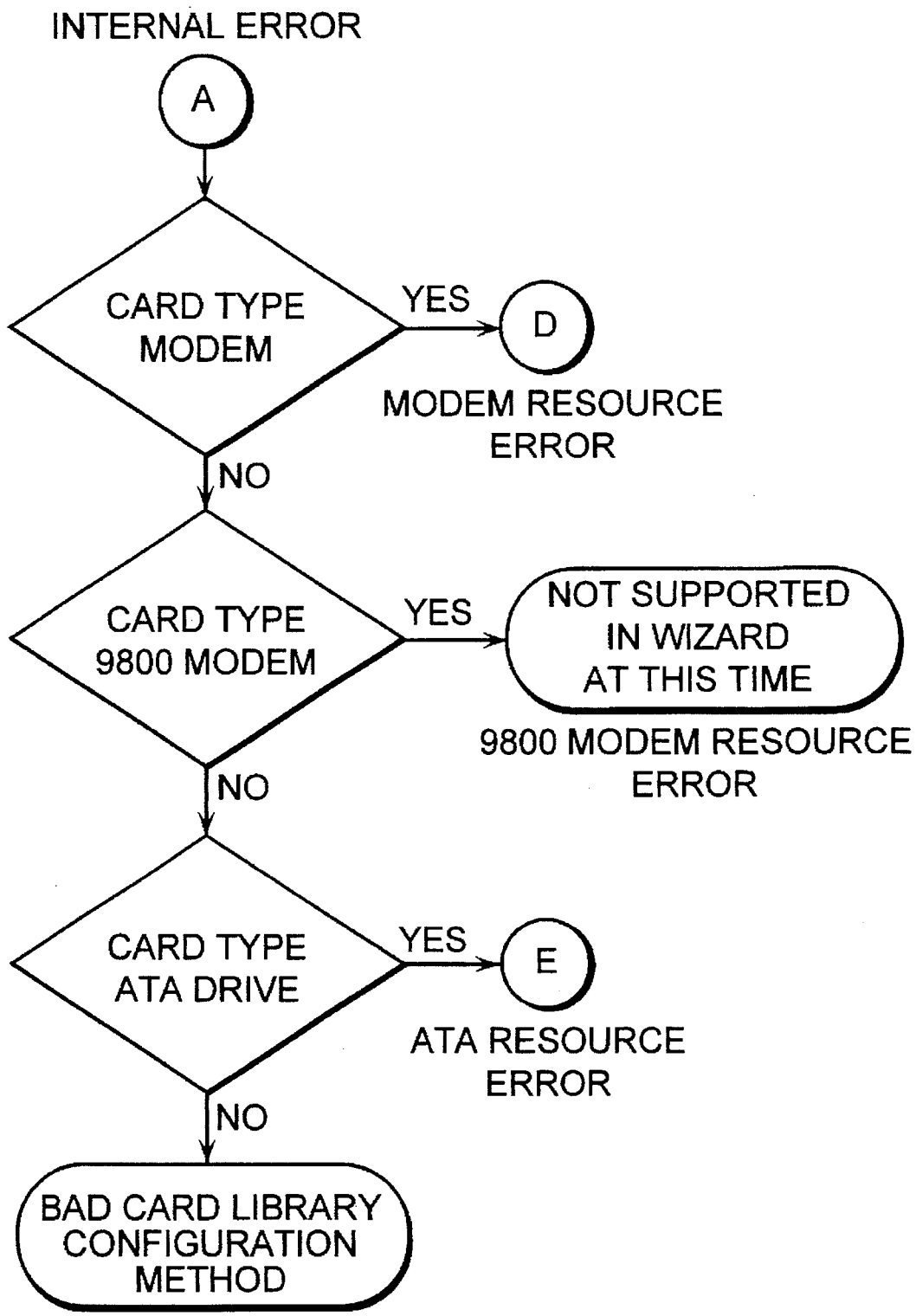
Figure 4C:
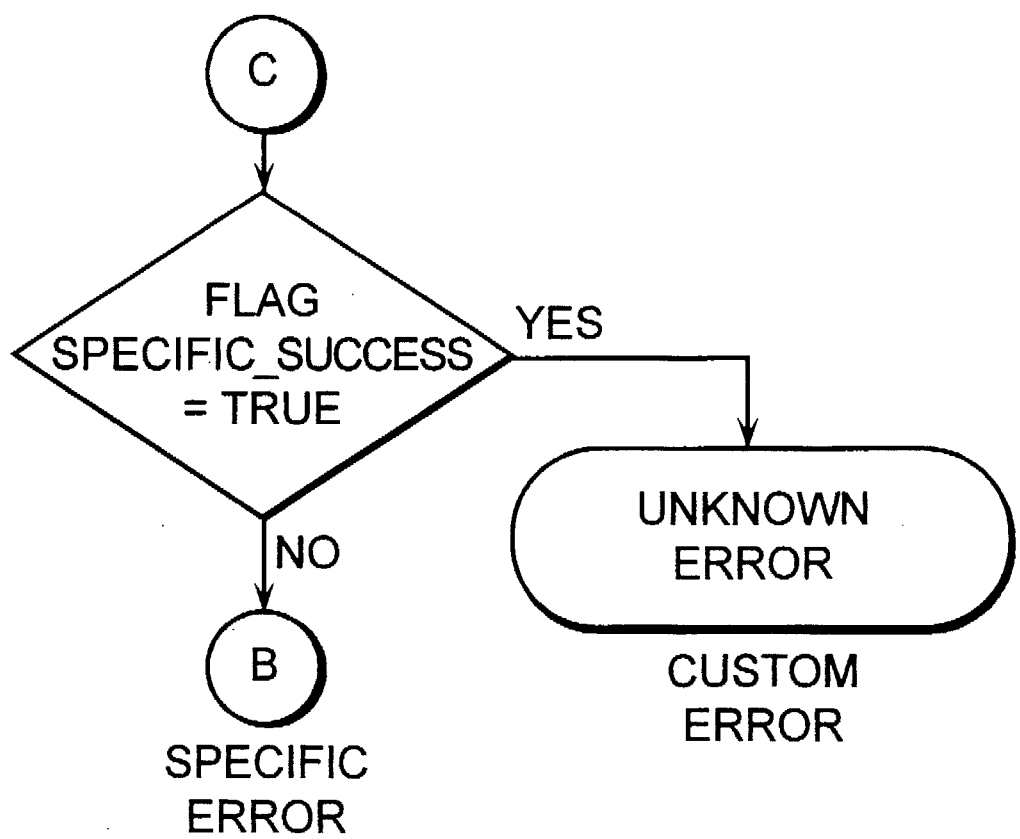
Figure 4D:
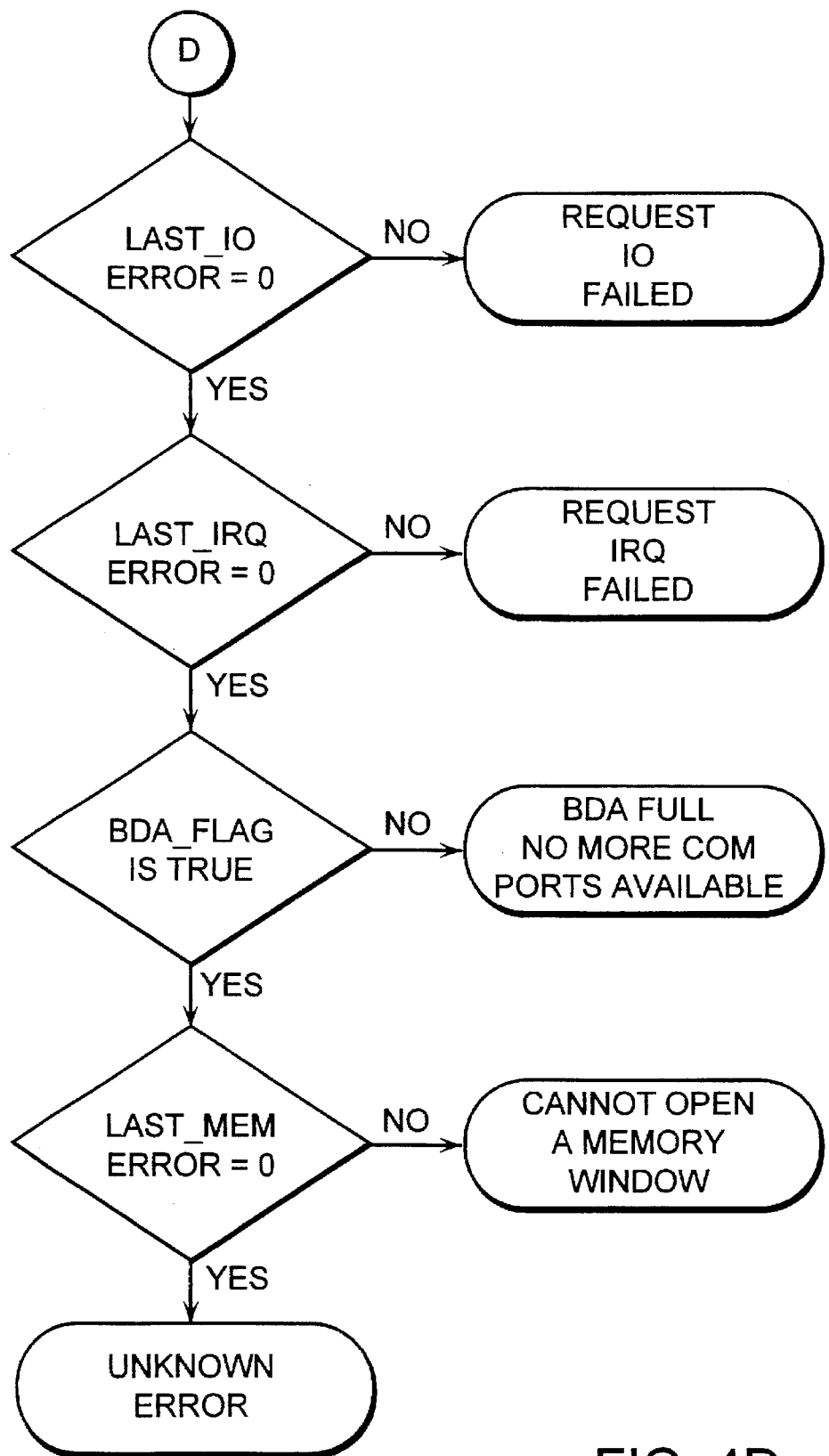
Figure 4E:
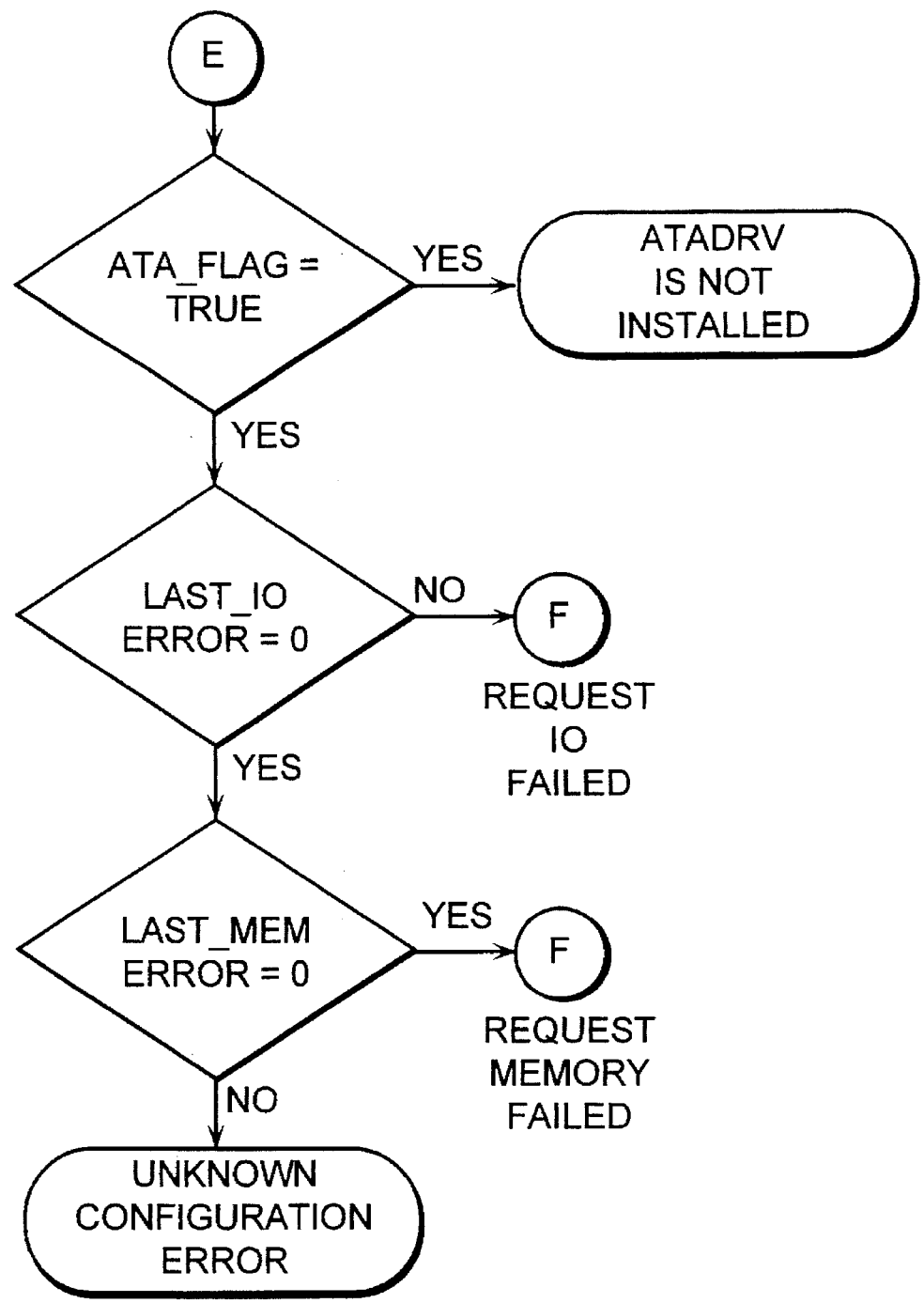
Figure 4F:
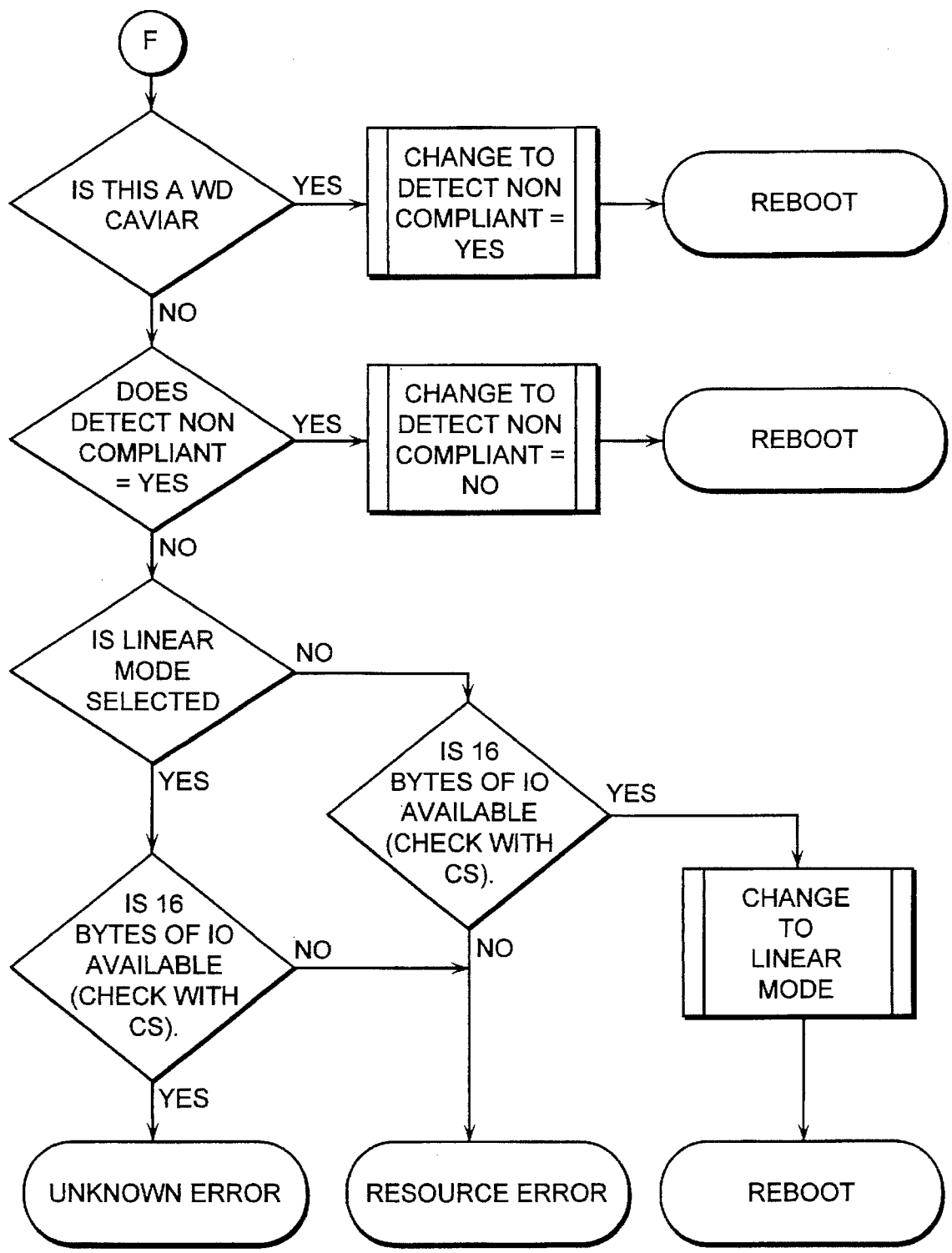
Figure 4G:
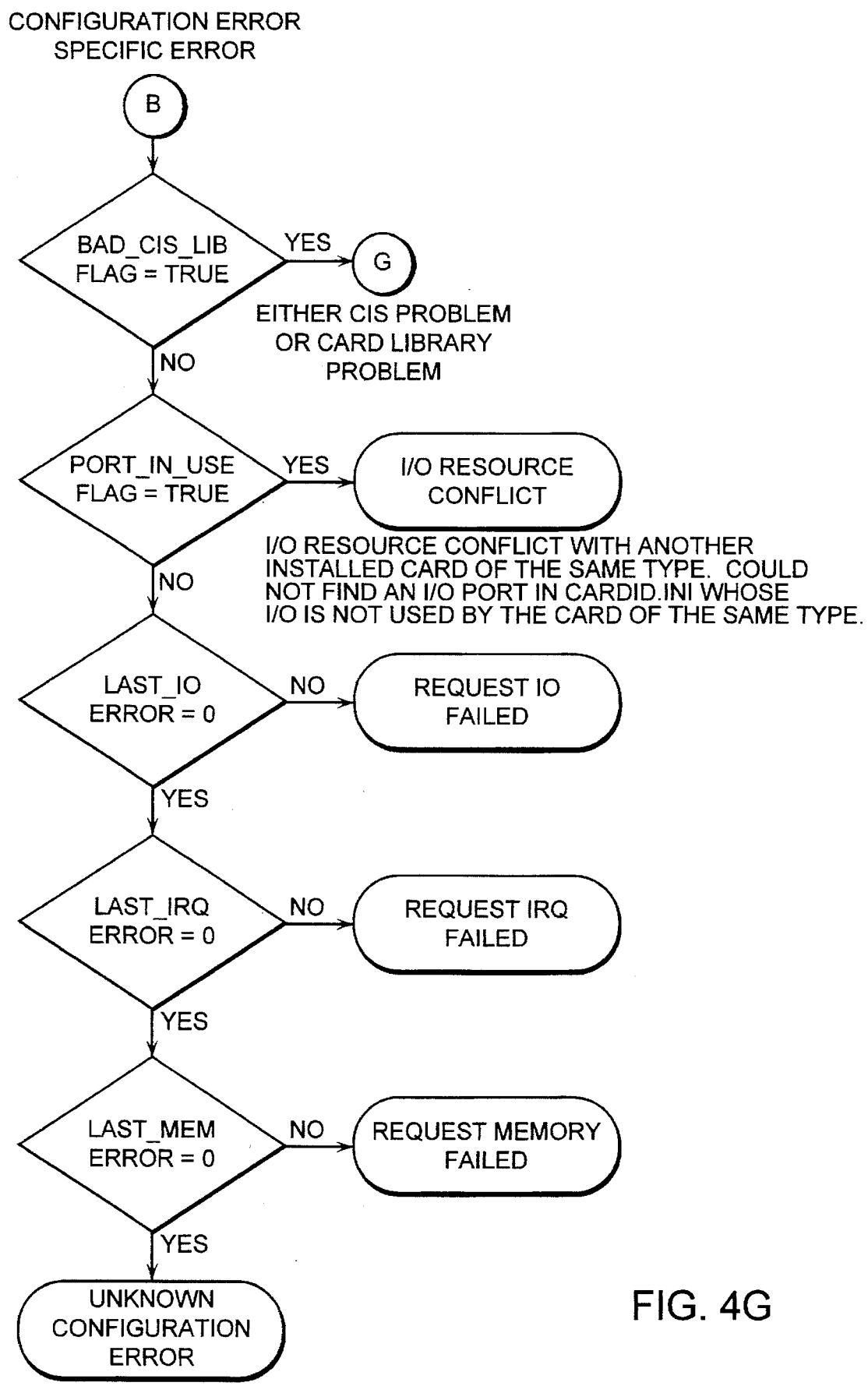
Figure 4H:
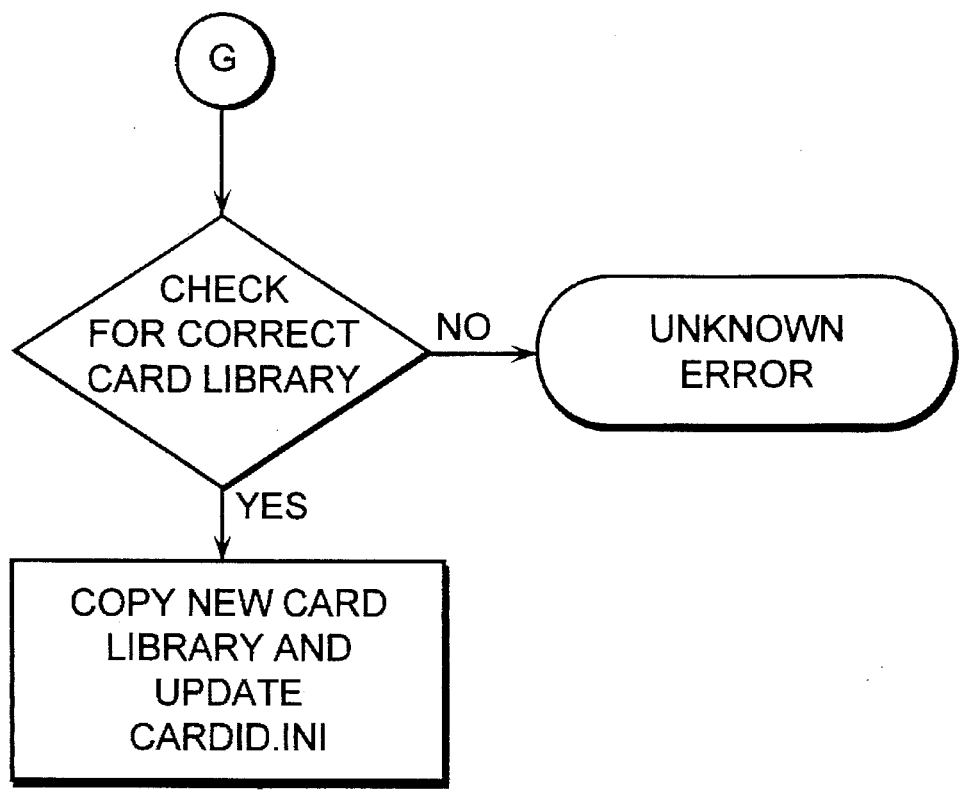
Figure 5A:
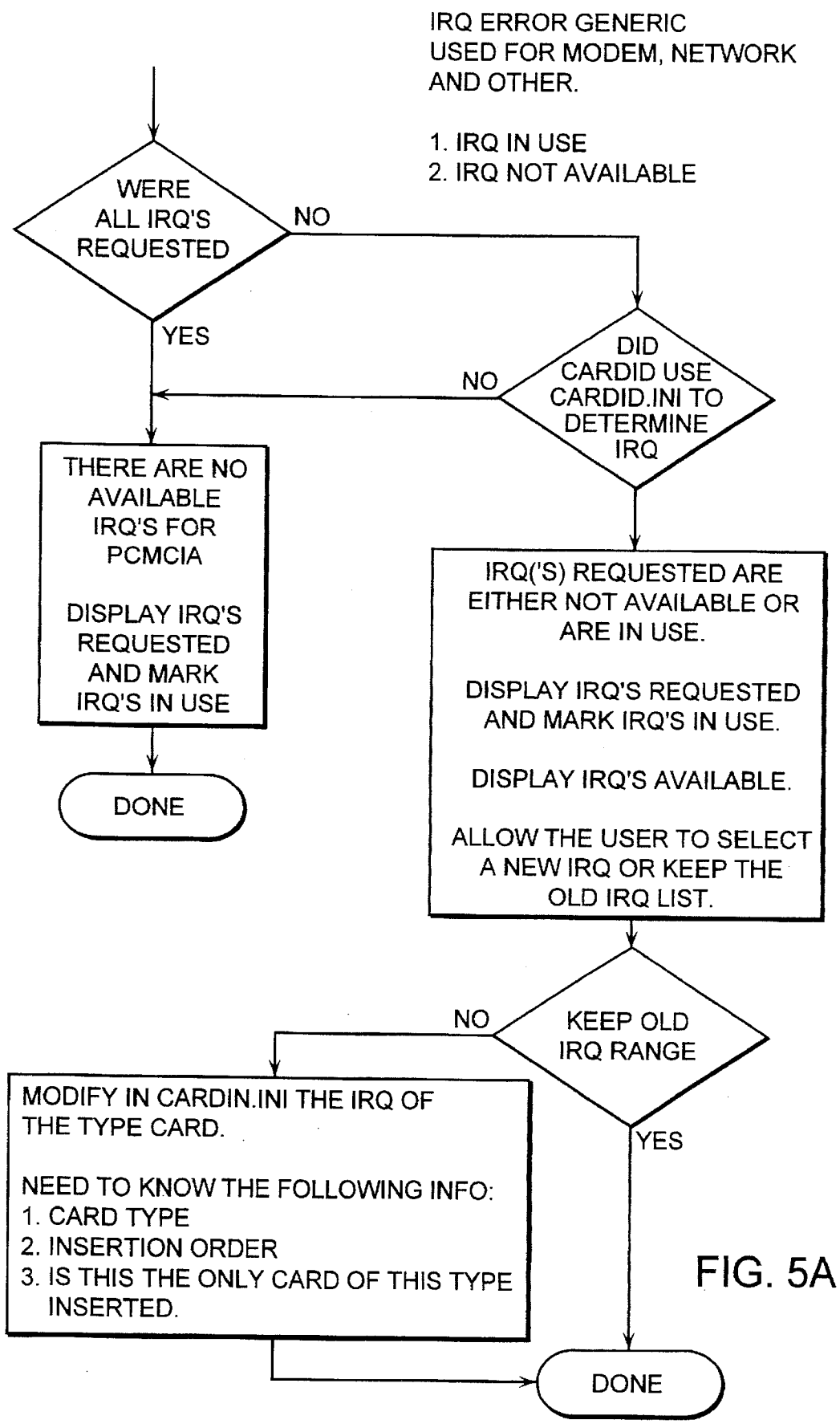
FIGS. 5A–5F are flow charts depicting a preferred decision tree-type analysis performed by the expert system to correct configuration faults in the super client.
Figure 5B:
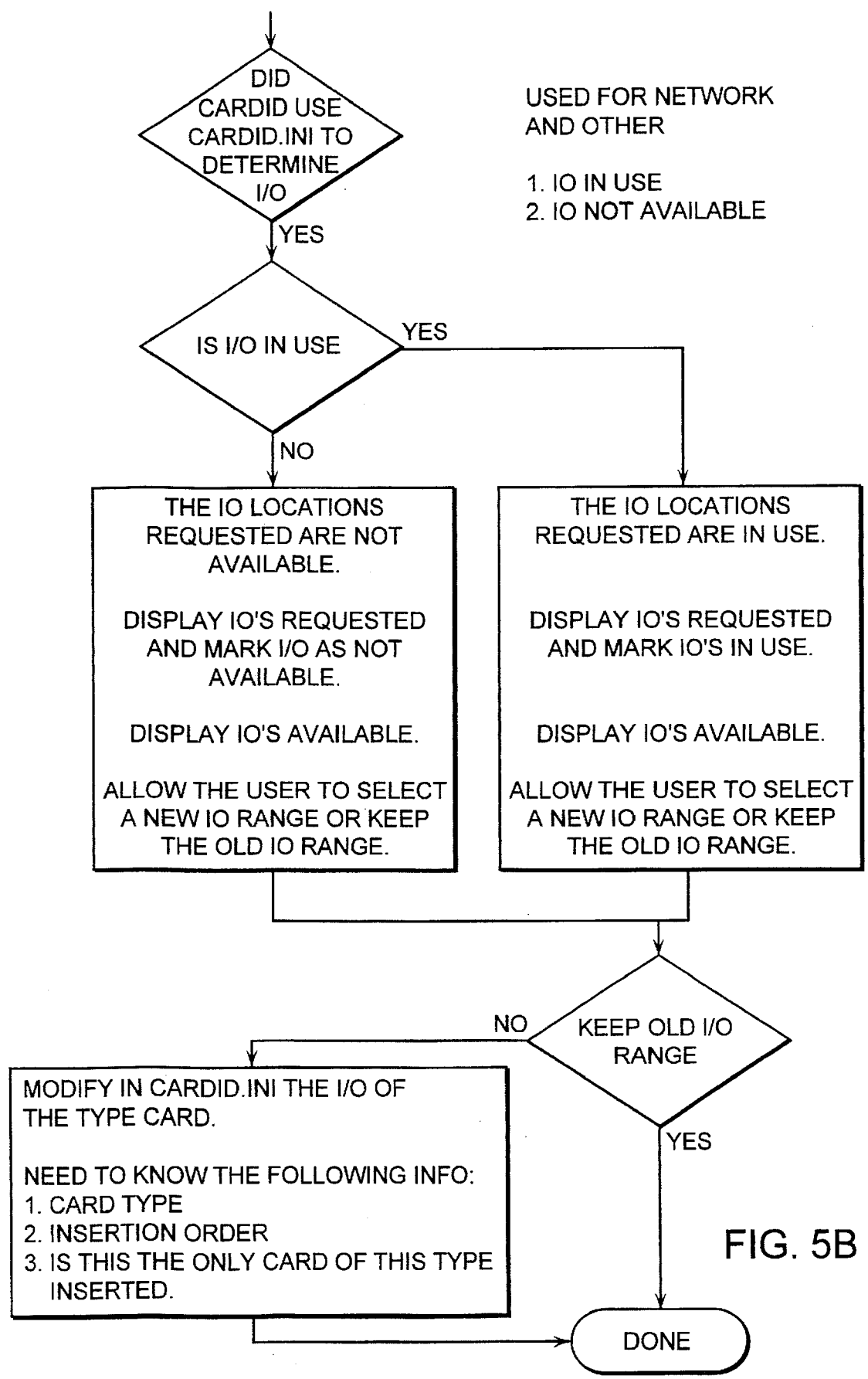
Figure 5C:
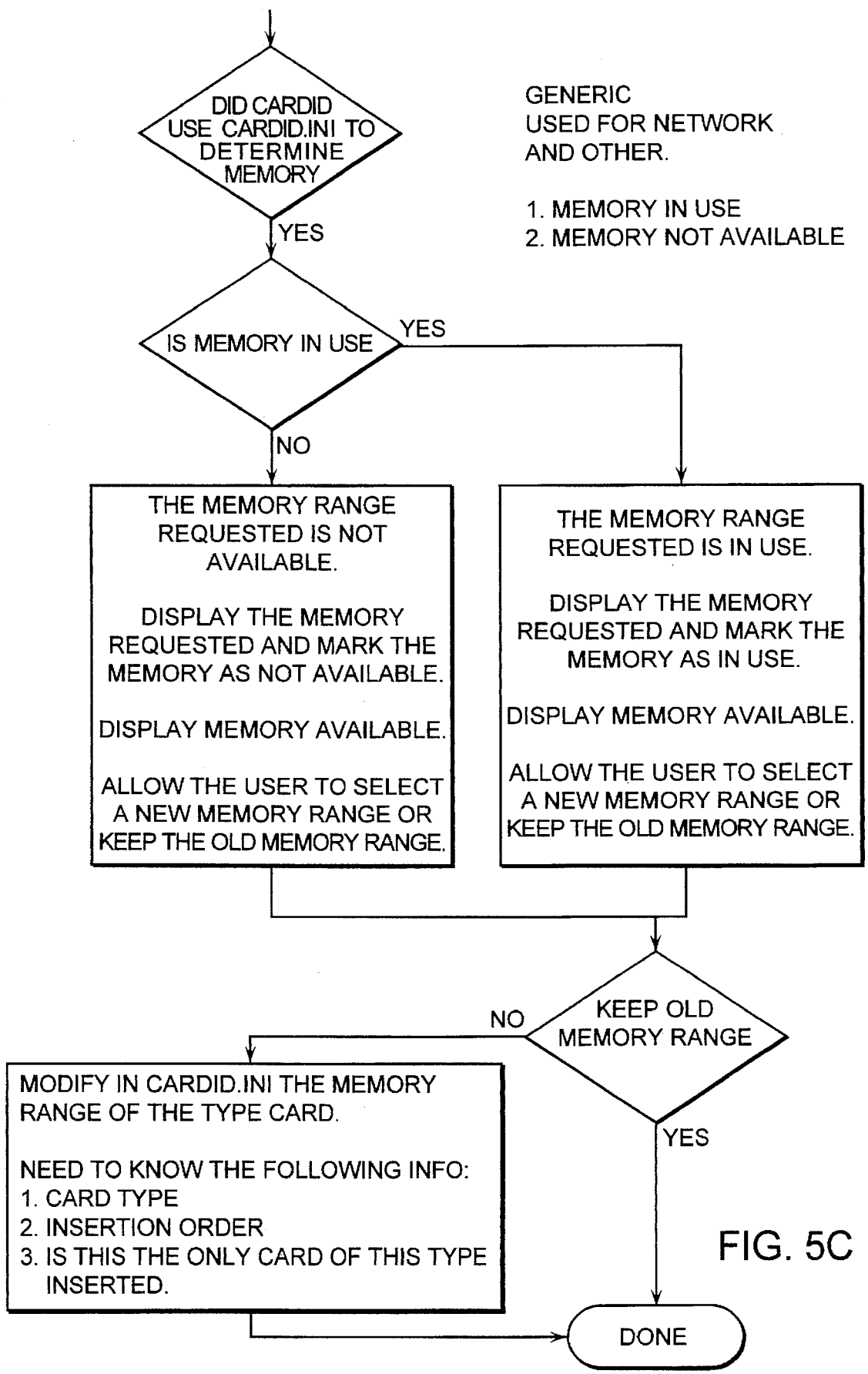
Figure 5D:
Figure 5E:
Figure 5F:
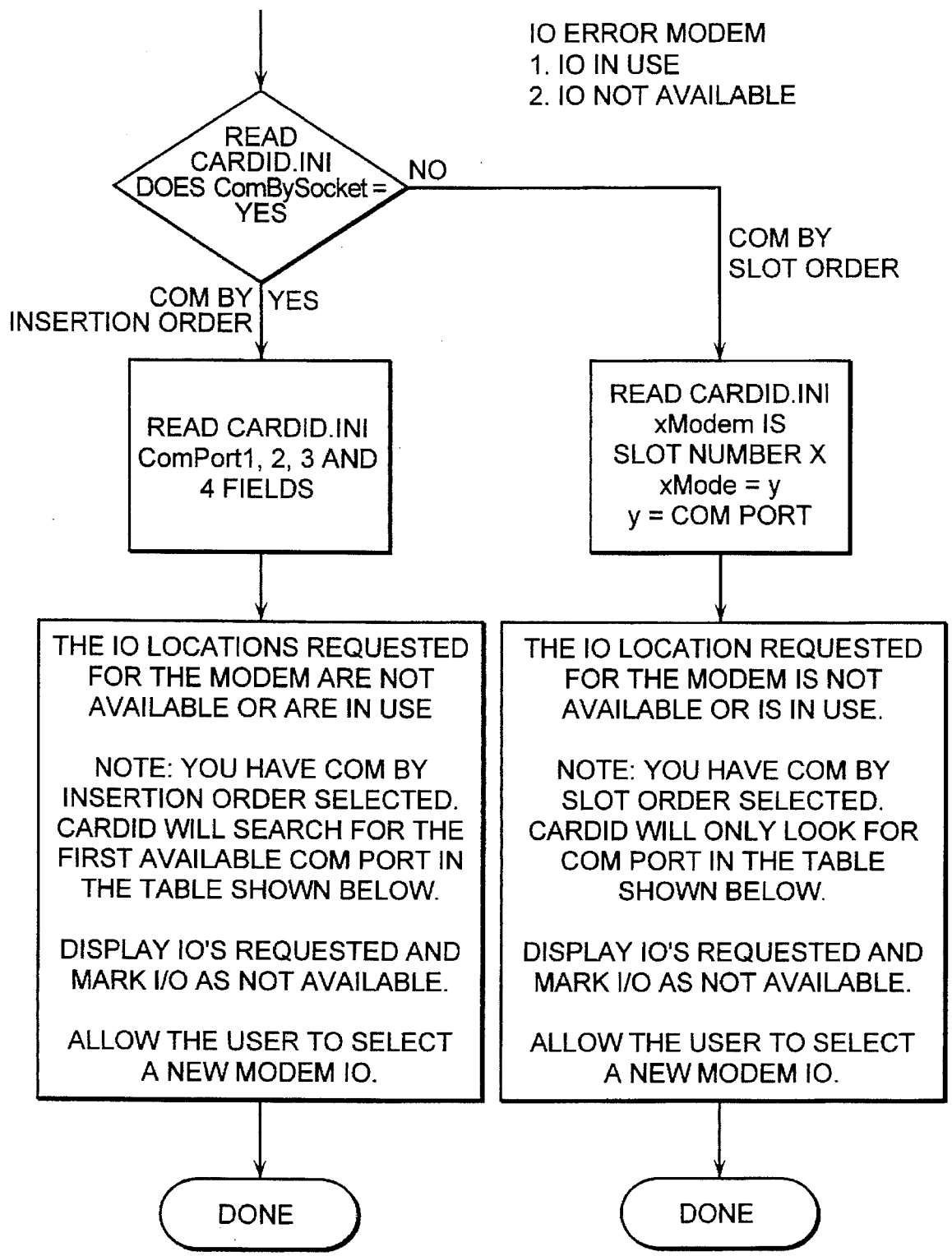

FIG. 3 is a flow chart of the operation of the peripheral device control subsystem 200. Referring to step 300, the super client extension 226A stores and generates information regarding resources allocated to the PC Cards 202, 204 and sockets 206, 208. This information can include, for example, the interrupt channels, memory space and I/O space assigned to the peripheral devices, as well as the bases for those assignments (e.g., resource allocation "algorithms"). This information can also reflect failed allocation requests, such as resource allocation error codes, identities of clients that generated failed requests and resources for which the requests failed.

In the illustrated embodiment, the information stored by the super client extension 226A is contained in a data structure, referred to as CARDID_ERROR_INFO, as described below. This structure is intended for use in connection with the aforementioned CARDID module of the CardSoft product, although those skilled in the art will appreciate that it may be readily applied to other super clients. One such structure is provided for each PC Card/socket combination.

```
typedef struct {
BYTE        io_ret              Return/Error information for reading Card Library
```

| | | records. If failure than an error occurred reading the CARDID Card library entry. |
|---|---|---|
| BYTE | cardlib_num; | For the recognizing CARDID Library the offset number, starting at the first library, for which CARDID found a match with the Card (ie the recognizing CARDID Library entry). |
| BYTE | recognize_algorithum; | Algorithm used by CARDID to recognize the Card. (ie.. Manufacture's name, Product name). Refer to CardSoft 3.1 Technical Reference Manual, filed as an Appendix herewith, for more details. |
| BYTE | config_algorithum; | Algorithm used by CARDID to configure the Card. (ie.. Generic, Custom). Refer to CardSoft 3.1 Technical Reference Manual, filed as an Appendix herewith, for more details. |
| UINT16 | recognize_ret; | Return/Error information from CARDID about the recognition procedure. |
| UINT16 | config_ret; | Return/Error information from CARDID about the configuration procedure. |
| UINT16 | Last_IRQ; | Last IRQ that was unsuccessfully tried. |
| UINT16 | Last_IO1_base; | Last IO 1 base address that was unsuccessfully tried. |
| UINT16 | Last_IO1_num; | Number of IO ports requested for the last IO 1 base address that was unsuccessfully tried. |
| UINT16 | Last_IO2_base; | Last IO 2 base address that was unsuccessfully tried. |
| UINT16 | Last_IO2_num; | Number of IO ports requested for the last IO 2 base address that was unsuccessfully tried. |
| UINT16 | Last_MEM_base; | Last Memory base address that was unsuccessfully tried. |
| UINT16 | Last_MEM_size; | Size of the memory requested for the last Memory base address that was unsuccessfully tried. |
| BYTE | card_type; | Card Type that CARDID recognized (Modem, ATA, Lan etc..). |
| BYTE | socket_state; | Returns the current state of the card in the socket. (inserted/removed). |
| UINT16 | error_flags; | Bit fields that are set/cleared based on internal state in CARDID during the recognition and configuration process. See error_flags bit definitions below. |
| } CARDID_ERROR_INFO; | | |

ERROR_FLAGS Bit Definitions:

The error_flags referred to above are defined as follows:

| | |
|---|---|
| NO_BDA_LEFT | Bios Data Area bas 4 COM ports allocated. |
| NO_ATA_AVAIL | The ATA Driver is not installed. |
| BAD_CIS_OR_LIB | The recognition failed because of either a problem with the CIS on the card of the invalid Card Library entry found. |
| PORT_IN_USE | Set if the IO location to be used is already used by another PCMCIA device. |
| INTERNAL_SUCCESS | The internal (uses one of CARDID preprogrammed configurations Modem, ATA), portion of a configuration succeeded. |
| SPECIFIC_SUCCESS | The specific (use the specific configuration in the CIS), portion of a configuration succeeded. |
| CHOOSE_IO_INI | If set then the IO location was chosen from the CARDID.ini settings otherwise the IO location was chosen from the CIS or Card Library entry. |
| CHOOSE_IRQ_INI | If set then the IRQ was chosen from the CARDID.ini settings otherwise the IRQ was chosen from the CIS or Card Library entry. |
| CHOOSE_MEM1_INI | If set then the Memory 1 location was chosen from the CARDID.ini settings otherwise the Memory 1 location was chosen from the CIS or Card Library entry. |
| CHOOSE_MEM2_INI | If set then the Memory 2 location was chosen from the CARDID.ini settings otherwise the Memory 2 location was chosen from the CIS or Card Library entry. |

During the normal course of events, the purpose of the illustrated super client, CARDID, is to recognize and configure PCMCIA cards for which it has Card Library entries. These libraries reside on the disk and are specified in the corresponding initialization file. This file, CARDID.INI, also contains initial values for specific parameters in CARDID. The libraries include information for recognizing and configuring Modems, ATA cards, LAN cards and other type of cards. The error information is maintained on a socket basis so that multiple sockets can be diagnosed. The information is collected at the time of insertion of the card and is retained for the fault detection and correction element 228 to recall at a later time. This allows the card to be inserted, a failure to occur and the fault detection and correction element to run at some time later to correct the problem.

The first step in the process is to read the CARDID Library. If an error occurs during this step, it is reported in the IO_RET variable. If no errors occur, then the next step is to attempt to recognize the card. This means matching the CIS information on the card with the requested information in the card library to see if there is a match. If there is no match, then the RECOGNIZE_RET variable is modified to contain the value "NO CONFIGURATION." If there is a match, then the RECOGNIZE_RET is set to NO ERROR and the RECOGNIZE_ALGORITHM is set to contain the algorithm used to recognize the card (i.e., Generic or Custom; refer to the *CardSoft 3.1 Technical Reference Manual*, filed as an Appendix herewith).

If the card is successfully configured, then the CARDLIB_NUM is set to the offset from the first Card Library entry in CARDID.INI to the matching library. The next step in the process is the configuration of the card. During that process, if a failure occurs the following variables are updated:

1. CONFIG_ALGORITHUM: The algorithm used by CARDID to configure the Card. (i.e., Generic, Custom). Refer to *CardSoft 3.1 Technical Reference Manual*, filed as an Appendix herewith, for more details. This is updated when a configuration type is determined.
2. CONFIG_RET: Return/Error information from CARDID about the configuration procedure. This is cleared at the start of the process (NO Error) and is modified during the configuration process if an error occurs.
3. LAST_IRQ: Last IRQ that was unsuccessfully tried. This variable is modified after an unsuccessful RequestIRQ to Card Services during the configuration of the card.
4. LAST_IO1_BASE: Last IO 1 base address that was unsuccessfully tried. This variable is modified after an unsuccessful RequestIO to Card Services during the configuration of the card.
5. LAST_IO2_BASE: Last IO 2 base address that was unsuccessfully tried. This variable is modified after an unsuccessful RequestIO to Card Services during the configuration of the card, when two IO windows are being requested.
6. LAST_IO1_NUM: Number of IO ports requested for the last IO 1 base address that was unsuccessfully tried. This variable is modified after an unsuccessful RequestIO to Card Services during the configuration of the card.
7. LAST_IO2_NUM: Number of IO ports requested for the last IO 2 base address that was unsuccessfully tried. This variable is modified after an unsuccessful RequestIO to Card Services during the configuration of the card, when two IO windows are being requested.
8. LAST_MEM_BASE: Last memory base address that was unsuccessfully tried. This variable is modified after an unsuccessful RequestWindow to Card Services during the configuration of the card.
9. LAST_MEM_SIZE: The size of the last memory base address that was unsuccessfully tried. This variable is modified after an unsuccessful RequestWindow to Card Services during the configuration of the card.
10. ERROR_FLAGS: Bit fields that are set/cleared based on internal state in CARDID during the recognition and configuration process. They are updated as appropriate during the processing to indicate certain failure modes that are not contained in the resource information, but are required in diagnosing PCMCIA card problems.

The following additional information is required to be able to diagnose PCMCIA failures.

11. CARD_TYPE: Card Type that CARDID recognized (Modem, ATA, Lan etc.). This is updated when after a card is recognized and its type is determined.
12. SOCKET_STATE: Returns the current state of the card in the socket. (inserted/removed). This is updated on insertion and removal of the cards.

In step 302, the card services extension 212A stores and generates information regarding failed requests for allocation of resources for the PC Cards 202, 204 and sockets 206, 208. Although this information is not as extensive as that provided by the super client extension 226A, it can include, for example, resource allocation error codes, identities of clients that generated failed requests and resources for which the requests failed.

In the illustrated embodiment, the information stored by the card services extension 212A is generated by invoking an extension of the card services applications program interface (API). That API extension, the function GetErrorInfo, is described below.

GetErrorInfo CardServices (VendorSpecific, Null, Null, ArgLength, ArgPointer)

This function is used to retrieve information about errors that have occurred on a specific socket.

Argument Packet Definition:

| Offset | Field | Size | Type | Value | Detail/Description |
|---|---|---|---|---|---|
| 0 | InfoLen | 2 | I/O | N | Length of returned information in packet. |
| 2 | SubComponentID | 1 | I | 7 | Get Information Sub Component ID |
| 3 | FunctionID | 1 | I | 1 | Get Error Info Function ID |
| 4 | Socket | 2 | I | N | Logical Socket |
| 6 | Attributes | 2 | O | N | Attributes entries |
| 8 | Handle | 2 | O | N | Handle of Client Making Resource Request |
| 10 | Error Code | 2 | O | N | Last PCMCIA Error Code Returned for the type error. |
| 12 | Error Information | N | O | N | Memory, I/O IRQ Error information |

The Attributes field is bit-mapped.

Bit 0    Last Error of this Type already read. (set to one = true)
Bits 1–31    RESERVED (reset to zero)

The Error Information has the following defined values:

| 0 | Last Memory Error Request. |
|---|---|
| 1 | Last I/O Error Request. |
| 2 | Last IRQ Error Request. |

This will report back the last Memory Error that occurred.

The Memory Error Entry has the following structure:

| Offset | Field | Size | Type | Value | Detail/Description |
|---|---|---|---|---|---|
| 0 | Attributes | 2 | O | N | Memory Window Attributes. Same as Request Window |
| 2 | Memory Base | 4 | O | N | Memory Base Address |
| 6 | Memory Size | 4 | O | N | Memory Size |

This will report back the last I/O Error that occurred. The I/O Error Entry has the following structure:

| Offset | Field | Size | Type | Value | Detail/Description |
|---|---|---|---|---|---|
| 0 | Base Port 1 | 2 | O | N | Base Port 1 Address |
| 2 | Num Ports 1 | 1 | O | N | Number of Contiguous Ports |
| 3 | Attributes 1 | 1 | O | N | Bit mapped. Same as RequestIo Attributes |
| 4 | Base Port 2 | 2 | O | N | Base Port 2 Address |
| 6 | Num Ports 2 | 1 | O | N | Number of Contiguous Ports |
| 7 | Attributes 2 | 1 | O | N | Bit mapped. Same as RequestIo Attributes |
| 8 | IO AddrLines | 1 | O | N | Number of IO Address Lines |

This will report back the last IRQ Error that occurred. The IRQ Error Entry has the following structure:

| Offset | Field | Size | Type | Value | Detail/Description |
|---|---|---|---|---|---|
| 0 | Attributes | 2 | O | N | Bit Mapped. Same as RequestIRQ |
| 2 | Assigned IRQ | 1 | O | N | IRQ Number assigned by CS |
| 3 | IRQ Info 1 | 1 | O | N | First PCMCIA IRQ Byte |
| 4 | IRQ Info 2 | 2 | O | N | Optional PCMCIA IRQ bytes |

This foregoing information is gathered at the time the of RequestIO, RequestIRQ or RequestWindow call. The information is gathered on a socket basis and only collected if a RequestIO, RequestIRQ or RequestWindow call results in an error. The information is resource error information showing the resource that is in conflict. The information is request using the extended GetErrorInfo CardServices API call. The return information contains specific information for each type of error along with some generic information. The following is the generic information returned:

13. Error Type: This can be either IO, IRQ or Memory.
14. Error Code: The standard PCMCIA error return code for the Error that occurred.
15. Attributes: Has two bit fields one is set if the last error that occurred was followed by successful request. The second bit field is used to tell if the last error information for this error has already been read.
16. Handle: The handle of the client making the request to CardServices. IRQ error.

The following information is collected for an IRQ error:

17. ATTRIBUTES: Same as defined in the RequestIRQ API.
18. ASSIGNED IRQ: Same as defined in the RequestIRQ API.
19. IRQ Info 1: Same as defined in the RequestIRQ API.
20. IRQ Info 2: Same as defined in the RequestIRQ API.

The following information is collected for an IO error:

21. BASE PORT 1: Same as defined in the RequestIO API.
22. NUM PORTS 1: Same as defined in the RequestIO API.
23. ATTRIBUTES 1: Same as defined in the RequestIO API.
24. BASE PORT 2: Same as defined in the RequestIO API.
25. NUM PORTS 2: Same as defined in the RequestIO API.
26. ATTRIBUTES 2: Same as defined in the RequestIO API.
27. IOADDRLINES: Same as defined in the RequestIO API.

The following information is collected for an Memory error:

28. ATTRIBUTES: Same as defined in the RequestWindow API.
29. MEMORY BASE: Same as defined in the RequestWindow API.
30. MEMORY SIZE: Same as defined in the RequestWindow API.

In step 304, the detection and correction element 228 utilizes expert system 230 to interpret the supplied information in order to identify and correct resource allocation faults.

In step 306, the fault detection and correction element 228 modifies the resource databases 214 and/or 227 to correct at least certain ones of the identified faults. Because those corrections are made to the database 214, they take effect without reinitialization of the CPU 104 or computer 106.

In step 308, the fault detection and correction element 228 makes further changes to the computer 106 in order to permanently correct identified faults. Those changes include modifying the DOS operating system file CONFIG.SYS (or the CardSoft™ product CSALLOC.INI file) to correct driver 224 parameters and assignments. In addition, the changes include updating or adding executable code for the drivers 224 and/or super client 226.

As shown in step 310, the changes take effect upon reinitialization of the computer. That reinitialization can be effected by the fault detection and correction element 228 or by the operator.

FIGS. 4A–4H are flow charts depicting a preferred decision tree-type analysis performed by expert system 230 to identify and correct faults in configuration of super client errors and, particularly, in the illustrated embodiment, errors in the CardID super client. The charts are intended for interpretation in the conventional manner and, hence, are not repeated here in prose.

Though applicable to a range of super clients, the charts utilize terminology specific to the aforementioned CARD-SOFT product. Accordingly, the CONFIG type refers to the Configuration Algorithm used by the illustrated super client, CARDID. Internal or Generic are configuration algorithms that are built into CARDID such as Modem, or ATA. Specific configuration algorithms use information from both the CIS on the Card and CARDID library to determine the best configuration for the card. Custom configuration is a mode in CARDID that allows the CARDID Library to have custom assembly language code as part the CARDID Library, thus CARDID executes the Custom code. CARDID also supports Internal plus Custom configuration algorithms and Specific plus Custom configuration algorithms. In this case the Flag Internal_Success refers to the Internal portion of the configuration succeeding. The Flag Specific_Success refers to the Specific portion of the configuration succeeding.

The additional terms required for the understanding of these charts are defined elsewhere herein. For a more detailed explanation of CARDID, please refer to the *Card-Soft 3.1 Technical Reference Manual*, filed as an Appendix hereto.

FIGS. 5A–5F are flow charts depicting a preferred decision tree-type analysis performed by expert system 230 to identify and correct configuration faults by the super client. The charts are intended for interpretation in the conventional manner and, hence, are not repeated here in prose. These flow charts are a continuation of those in FIGS. 4A–4H. For the most part the foregoing set showed diagnosing the configuration error problems, while this set shows the correction of the configuration problems, including modification of the CARDID.INI file.

Though applicable to a range of super clients, the charts utilize terminology specific to the aforementioned CARD-SOFT product. Accordingly, ComBySocket means that a COM port is associated with a particular socket. The other state in CARDID would be COMByInsertion meaning that a COM port would be associated with the first insertion of a modem card and if a second modem type card was inserted it would have the second COM port specificied regardless of the socket number.

Figure 6A:
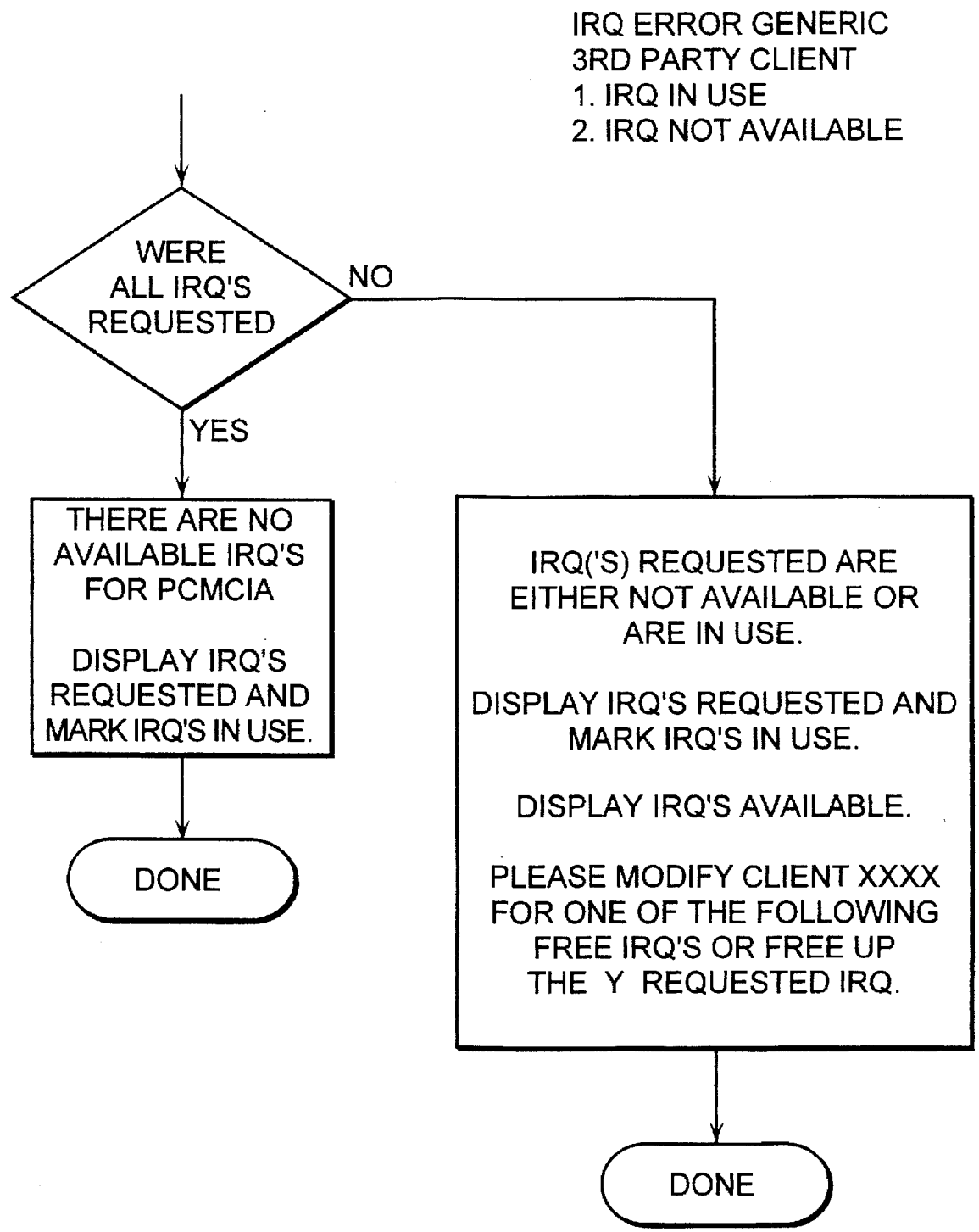
FIGS. 6A–6C are flow charts depicting a preferred decision tree-type analysis performed by the expert system to identify and correct configuration faults in the card services layer.
Figure 6B:
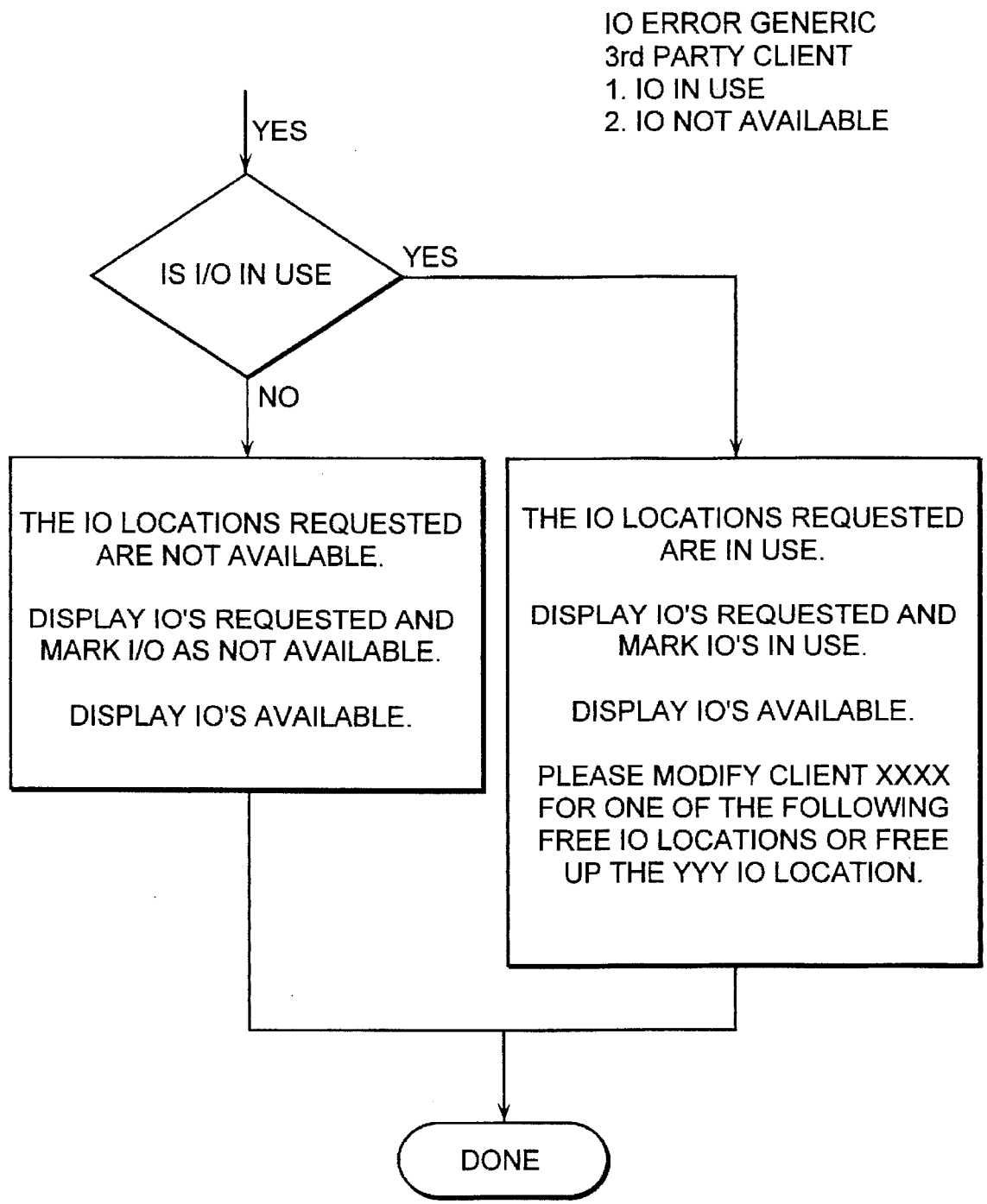
Figure 6C:
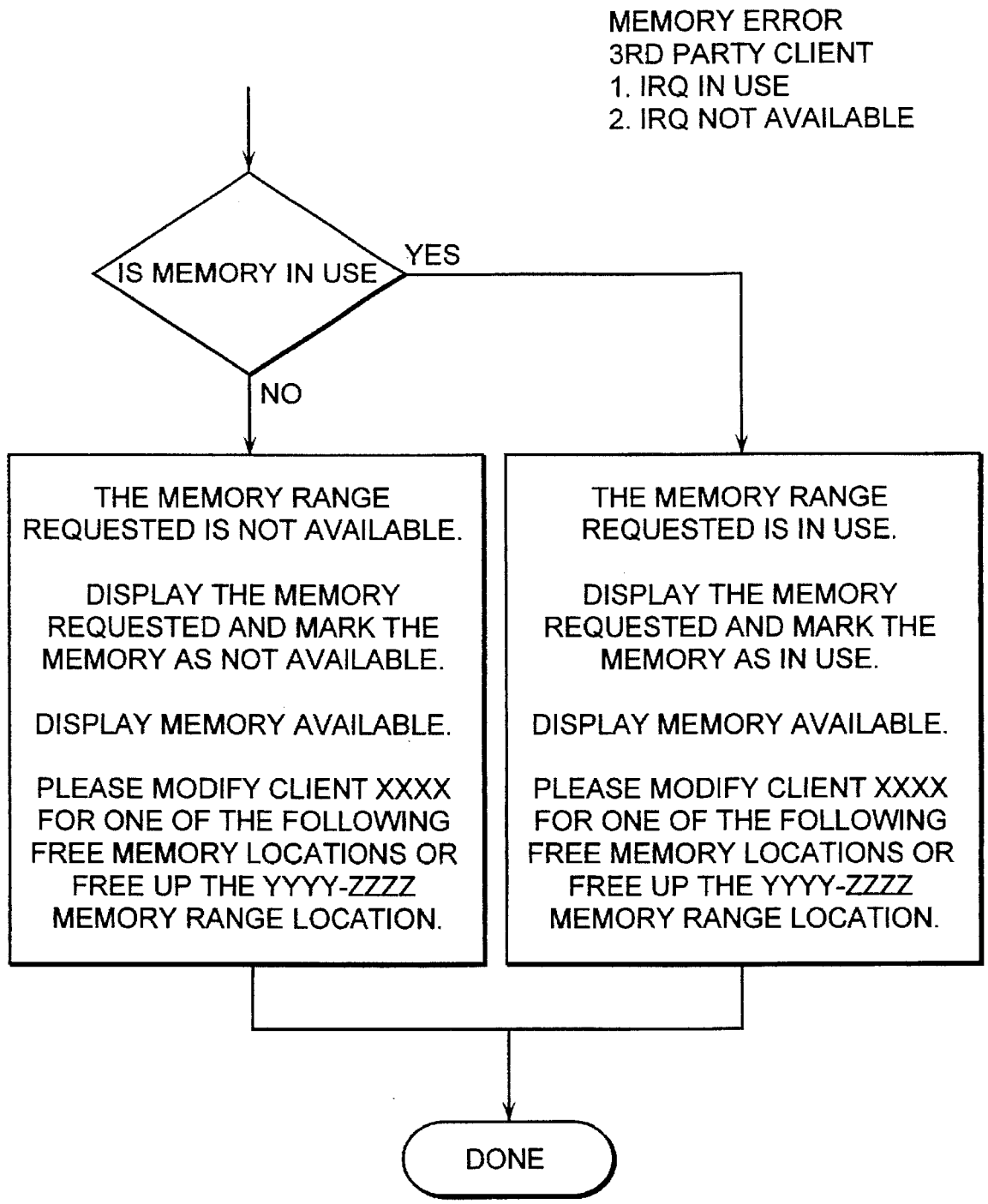

FIGS. 6A–6C are flow charts depicting The charts are intended for interpretation in the conventional manner and, hence, are not repeated here in prose.

Though applicable to a range of super clients, the charts utilize terminology specific to the aforementioned CARD-SOFT product. Accordingly, the a 3rd Party Client refers to a client other then CARDID. The term IRQ Error Generic refers to a IO, IRQ or Memory configuration error of from a 3rd party client.

It is possible to do error determination on a 3rd party client via the GetErrorInfo CardServices call modification made to CardServices. It is also possible to do error correction as long as the INI file or other configuration file is known by the error correction and detection module program. The flow charts show the error determination aspects, since the correction aspects are client specific. The method of determination of the error that would include the information that the expert system would have knowledge of is part of the flow chart. In this case the error information retrieved via the GetErrorInfo, CardServices call is fed into the expert system and the expert system determines the appropriate action to be taken and advises the user of the correction necessary.

It is also possible to use the CardServices error information to identify and correct errors that are CARDID Client errors resulting from Custom Code configuration errors. For example, if the custom code in the CardLibrary was used to configure the memory window and an error occurred because of a memory resource conflict, then rising GetErrorInfo, the CardServices call would cause the memory error to be reported to the fault detection and correction element 228, while the CARDID error information would contain a Custom Code error of the CardLibrary used to configure the card. From this information the fault detection and correction element would be able to determine and correct the problem. Both the CARDID error information and the CardServices error information are used in problem detection.

Figure 7:
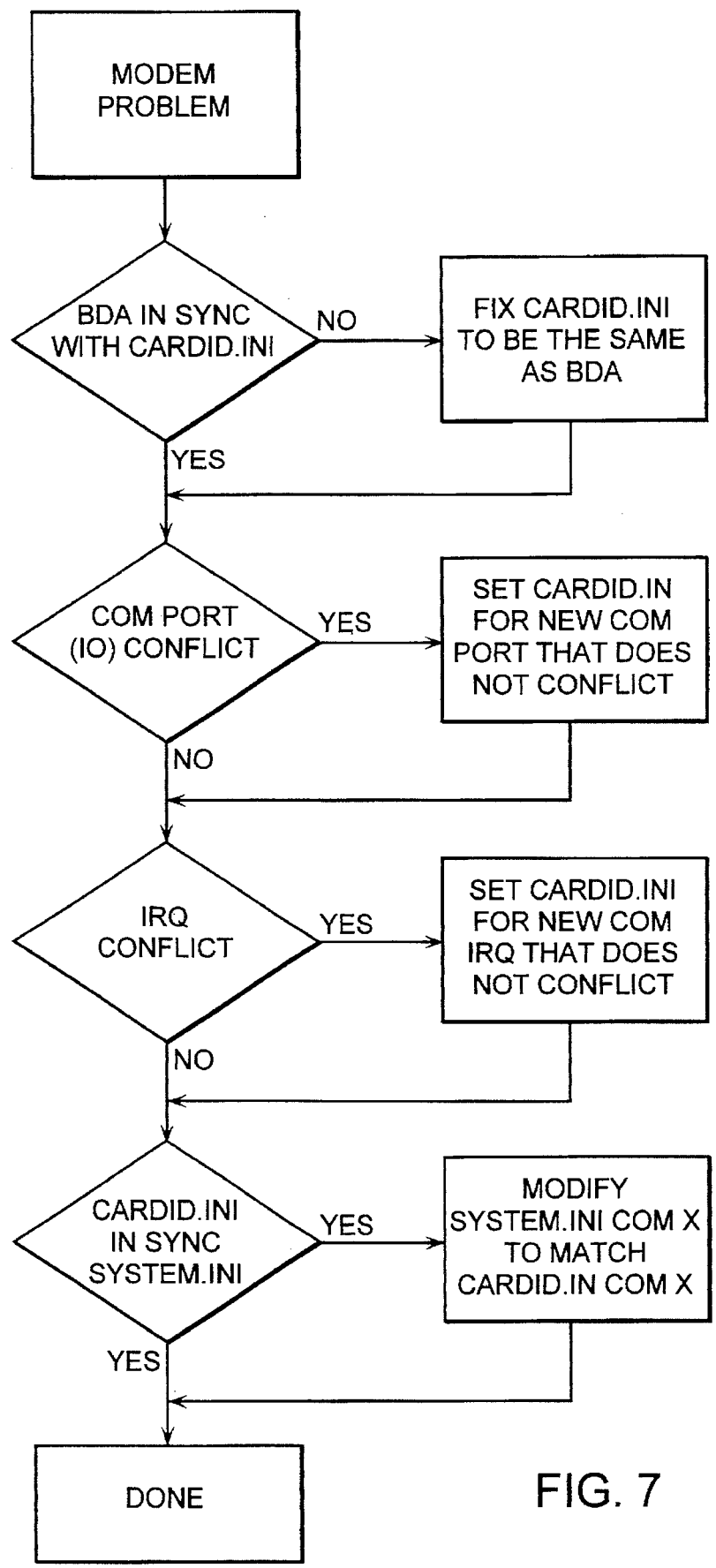
FIG. 7 is a flow chart depicting a preferred decision tree-type analysis performed by the expert system to identify and correct modem configuration faults.

FIG. 7 is a flow chart depicting a preferred decision tree-type analysis performed by expert system 230 to identify and correct configuration faults in modems. The charts are intended for interpretation in the conventional manner and, hence, are not repeated here in prose. Though applicable to a range of super clients, the charts utilize terminology specific to the aforementioned CARDSOFT product.

The Modem problem posses additional issues that are not just PCMCIA related. The modem will not work properly if it is just configured. The Bios Data Area, section of the Bios Ram containing variables used by the bios, must contain the correct serial port address. Also the Bios data area address, the CARDID.INI modem address and the Windows SYSTEM.INI com port address all must agree (i.e., they must be in sync). Also the CARDID.INI IRQ specified for the modem and the System.ini irq specified for the modem must agreee (i.e., they must be in sync). The flow chart shows the process that the expert system goes through in order to verily, correct if necessary, all of the items required for modem cards to be configured and work correctly with communications programs.

The expert system 230 attempts to determine the cause of the failure by determining if a card was recognized by a particular client. If a client did not recognize the card, then the expert system will assist the user in trying to chose the right client for the card and then update the CONFIG.SYS to add the new client driver. The expert system checks to make sure that correct drivers are loaded into the CONFIG.SYS, by comparing the CONFIG.SYS against its internal table of drivers required. If the expert system finds a missing driver or that the card requires a third party client the correction can then proceed. The expert system also checks to make sure that there is enough Memory allocated to CardServices in order for the Card to be recognized and configured. If the Memory is to little then the expert system can increase the amount of memory allocated to CardServices by adjusting the memory manager memory exclude line in the config.sys. For example modify x=in the EMM386.SYS line. The expert system would also modify the CSALLOC.INI file to allow CardServices to be given additional memory resources.

If the expert systems 230 finds the correct drivers are loaded and the amount of memory allocated to CardServices is correct the expert system will determine if a resource conflict occurred. This process and the corrections that occur are document in the previous sections detailing the flow charts that the expert system follows. If a conflict still exists, the expert system can scan the system for Memory, I/O and IRQ's that are available to verify the CardServices database. If the expert system finds that the CardServices database is incorrect, the expert system can correct the CardServices database and it can update the CSALLOC.INI file. The process of doing a scan requires that all windows programs be exited.

A further appreciation of the invention may be attained by reference to the software listing provided in the Appendices B and C hereto. Those listings, which are in the C programming language, pertain to a card services layer and super client used in a preferred practice of the invention. Particularly, the code in Appendix B is from a preferred super client, CARDID, and shows in the process of recognition and configuration an implementation of how and when the error information is collected. The error information data structure was previously defined and described in this document.

The code in Appendix C is from a preferred CardServices layer, particularly, that contained in the aforementioned CardSoft product. That code shows how and when the error information is collected for a RequestIRQ, RequestIO or a RequestWindow PCMCIA function call. This error information is then translated into the structure that is used by the CardServices GetErrorInfo call. The sample code includes the code that does the translation and the sample structures used. This function call was previously defined and described in this document Described above are methods and apparatus for diagnosis and correction of peripheral device allocation faults meeting the objects of the invention. Those methods and apparatus can, for example, resolve conflicts between a range of PCMCIA-compatible devices and on a range of personal computers. Further, they can operate automatically, as well as under user control.

It will be appreciated that the embodiments described above are merely examples of the invention and that other embodiments incorporating modifications therein are contemplated to fall within the scope of the invention. For example, it will be appreciated that extensions described above can be applied to a range of card services modules and super clients, as well as drivers. By way of further example, the expert system may perform its analysis using any of many known expert system analysis techniques.

In view of the foregoing, what we claim is:

1. In a digital data processor of the type having
   one or more sockets for receiving PCMCIA-compliant peripheral devices,
   a peripheral device service subsystem for handling communications between client applications and peripheral devices in the sockets,
   the peripheral device service subsystem including
      super client means for requesting allocation of resources for a socket that has received any of a plurality of peripheral devices,
      the super client including a first resource database identifying resources allocated to a socket for which the super client has requested allocation of resources,
      a card services layer, in communication with the super client means, and with zero, one or more other client applications, for allocating resources to sockets having received therein peripheral devices,
      the card services layer including a second resource database identifying resources allocated to each socket,
   the further improvement wherein
      the super client means includes means for storing and generating information regarding resources allocated to the sockets and regarding any failed request therefor,
      the digital data processor further includes fault detection and correction means, coupled with the super client means, for interpreting the information generated thereby to identify a fault in allocation of resources to the sockets, and
      the fault detection and correction means including dynamic fault correction means for modifying at least one of the first and second resource databases to correct at least selected such faults without requiring reinitialization of the digital data processor.

2. In a digital data processor according to claim 1, wherein
   the super client includes means responsive to one or more initialization files on the digital data processor for generating the first resource database,
   the card services layer includes means responsive to one or more initialization files on the digital data processor for generating the second resource database,
   the improvement wherein
      the fault detection and correction means includes means for permanent fault correction means for modifying at least one of an initialization file and a device driver resident on the digital data processor.

3. In a digital data processor according to claim 1, wherein
   the card services layer responds to a failed request from a client application for allocation of resources for a socket for signalling an error,
   the further improvement wherein the card services layer includes get_error_info means includes means for storing information regarding a failed request for resources for a socket, and including any of an error code, an identity of the client application that made the failed request, and the requested resource.
   the fault detection and correction means includes means responsive to that information to identify a fault in an allocation of resources to a socket.

4. In a digital data processor according to any of claims 1–3, the further improvement wherein the fault detection and correction means includes an expert system for interpreting information to identify a fault in an allocation of resources to a socket and to correct such fault.

5. A method of operating a digital data processor of the type having
   one or more sockets for receiving PCMCIA-compliant peripheral devices,
   a peripheral device service subsystem for handling communications between client applications and peripheral devices in the sockets,
   the peripheral device service subsystem including
      a super client for requesting allocation of resources for a socket that has received any of a plurality of peripheral devices,
      the super client including a first resource database identifying resources allocated to a socket for which the super client has requested allocation of resources,
      a card services layer, in communication with the super client means, and with zero, one or more other client applications, for allocating resources to sockets having received therein peripheral devices,
      the card services layer including a second resource database identifying resources allocated to each socket,
   the improvement comprising
      generating, with the super client, information regarding resources allocated to the sockets and regarding any failed request therefor,
      interpreting the information generated by the super client to identify a fault in allocation of resources to the sockets, and
      modifying at least one of the first and second resource databases to correct at least selected such faults without requiting reinitialization of the digital data processor.

6. A method according to claim 5, wherein the super client includes means responsive to one or more initialization files on the digital data processor for generating the first resource database, the card services layer includes means responsive to one or more initialization files on the digital data processor for generating the second resource database, the improvement comprising modifying at least one of an initialization file and a device driver resident on the digital data processor.

7. A method according to claim 5, wherein the card services layer responds to a failed request from a client application for allocation of resources for a socket for signalling an error, the further improvement comprising storing, with the card services layer, information regarding a failed request for resources for a socket, including any of an error code, an identity of the client application that made the failed request, and the requested resource.

responding to that information to identify a fault in an allocation of resources to a socket.

8. A method according to any of claims 5–7, the further improvement comprising using an expert system to interpret information generated by at least one of the card services layer and the super client to identify a fault in an allocation of resources to a socket and to correct such fault.

* * * * *